(12) United States Patent
Nagai et al.

(10) Patent No.: US 9,049,026 B2
(45) Date of Patent: Jun. 2, 2015

(54) AUTHENTICATOR, AUTHENTICATEE AND AUTHENTICATION METHOD

(75) Inventors: Yuji Nagai, Sagamihara (JP); Taku Kato, Kamakura (JP); Hiroyuki Sakamoto, Ome (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/001,577

(22) PCT Filed: Sep. 26, 2011

(86) PCT No.: PCT/JP2011/072699
§ 371 (c)(1),
(2), (4) Date: Oct. 31, 2013

(87) PCT Pub. No.: WO2012/144096
PCT Pub. Date: Oct. 26, 2012

(65) Prior Publication Data
US 2014/0052988 A1 Feb. 20, 2014

(30) Foreign Application Priority Data

Apr. 22, 2011 (JP) .................. 2011-096499

(51) Int. Cl.
*H04L 9/32* (2006.01)
*H04N 7/167* (2011.01)

(52) U.S. Cl.
CPC .............. *H04L 9/32* (2013.01); *H04L 9/3273* (2013.01); *H04L 2209/30* (2013.01); *H04L 2209/34* (2013.01); *H04L 2209/60* (2013.01); *H04L 2209/805* (2013.01)

(58) Field of Classification Search
CPC .................... H04L 2209/805; H04L 2209/30; H04L 9/32

USPC .......... 713/168–169, 175; 380/270, 277, 283; 235/451

See application file for complete search history.

(56) References Cited

U.S. PATENT DOCUMENTS 5,269,521 A * 12/1993 Rossides .................... 705/14.14
5,620,182 A * 4/1997 Rossides .................... 273/138.2
(Continued)

FOREIGN PATENT DOCUMENTS

JP 2000 357213 12/2000
JP 2003 099332 4/2003
(Continued)

OTHER PUBLICATIONS

Combined Office Action and Search Report issued Mar. 14, 2014 in Taiwanese Patent Application No. 100133607 (with English language translation).
(Continued)

*Primary Examiner* — Abu Sholeman
(74) *Attorney, Agent, or Firm* — Oblon, McClelland, Maier & Neustadt, L.L.P.

(57) ABSTRACT

According to one embodiment, an authenticatee includes, a memory configured to store secret information XYmain, XYsub, and secret information $XYmain_E$, $XYsub_E$, a generation module configured to generate a random number A, a generation module configured to generate a random number D which is composed of at least a part of the generated random number A and a random number B which is received, a generation module configured to generate secret information XY based on the secret information XYmain, XYsub loaded from the memory, a calculating module configured to generate data C by executing a compression calculated operation with respect to at least a part of the random number D and the secret information XY, a generation module configured to generate data v, and a bit-by-bit addition module configured to calculate an calculated result Z from the data v and the data C.

15 Claims, 22 Drawing Sheets

(56) References Cited

U.S. PATENT DOCUMENTS

| | | | |
|---|---|---|---|
| 6,523,148 B1 | 2/2003 | Junghans | |
| 6,952,476 B1* | 10/2005 | Mao | 380/30 |
| 7,065,648 B1 | 6/2006 | Kamibayashi et al. | |
| 7,730,329 B2 | 6/2010 | Strom et al. | |
| 7,828,213 B2* | 11/2010 | Chabanne et al. | 235/451 |
| 2002/0001289 A1* | 1/2002 | Liebenow | 370/328 |
| 2004/0056984 A1* | 3/2004 | Hayes et al. | 348/734 |
| 2005/0239069 A1* | 10/2005 | Maurer et al. | 435/6 |
| 2006/0112421 A1* | 5/2006 | Beierwalters et al. | 726/5 |
| 2008/0048035 A1* | 2/2008 | Chabanne et al. | 235/451 |
| 2010/0153719 A1* | 6/2010 | Duc et al. | 713/168 |
| 2010/0153731 A1* | 6/2010 | Duc et al. | 713/175 |
| 2010/0161988 A1* | 6/2010 | Robshaw et al. | 713/170 |
| 2010/0199090 A1 | 8/2010 | Berbain et al. | |
| 2011/0267385 A1* | 11/2011 | Ninan | 345/690 |

FOREIGN PATENT DOCUMENTS

| | | |
|---|---|---|
| JP | 2008 198272 | 8/2008 |
| TW | 200620127 A | 6/2006 |
| WO | 01 15373 | 3/2001 |
| WO | 2007 102907 | 9/2007 |

OTHER PUBLICATIONS

Kou-Min Chang, "A Study of User Authentication on Credit Cards", Department of Information Management, Chaoyang University of Technology, Thesis for the Degree of Master, May 23, 2005, pp. 1-79 (with English abstract).

U.S. Appl. No. 13/985,436, filed Aug. 14, 2013, Nagai et al.

U.S. Appl. No. 13/985,431, filed Aug. 14, 2013, Nagai et al.

Piramuthu, S., "Lightweight Cryptographic Authentication in Passive RFID-Tagged Systems", IEEE Transactions on Systems, Man and Cybernetics; Part C: Applications and Reviews, vol. 38 No. 3, pp. 360-376, XP011345976, (May 1, 2008).

International Search Report Issued Feb. 3, 2012 in PCT/JP2011/072699 Filed Sep. 26, 2011.

* cited by examiner

Comparative Example 1 (HB+Protocol)

Comparative Example 2 (Random HB#Protocol)

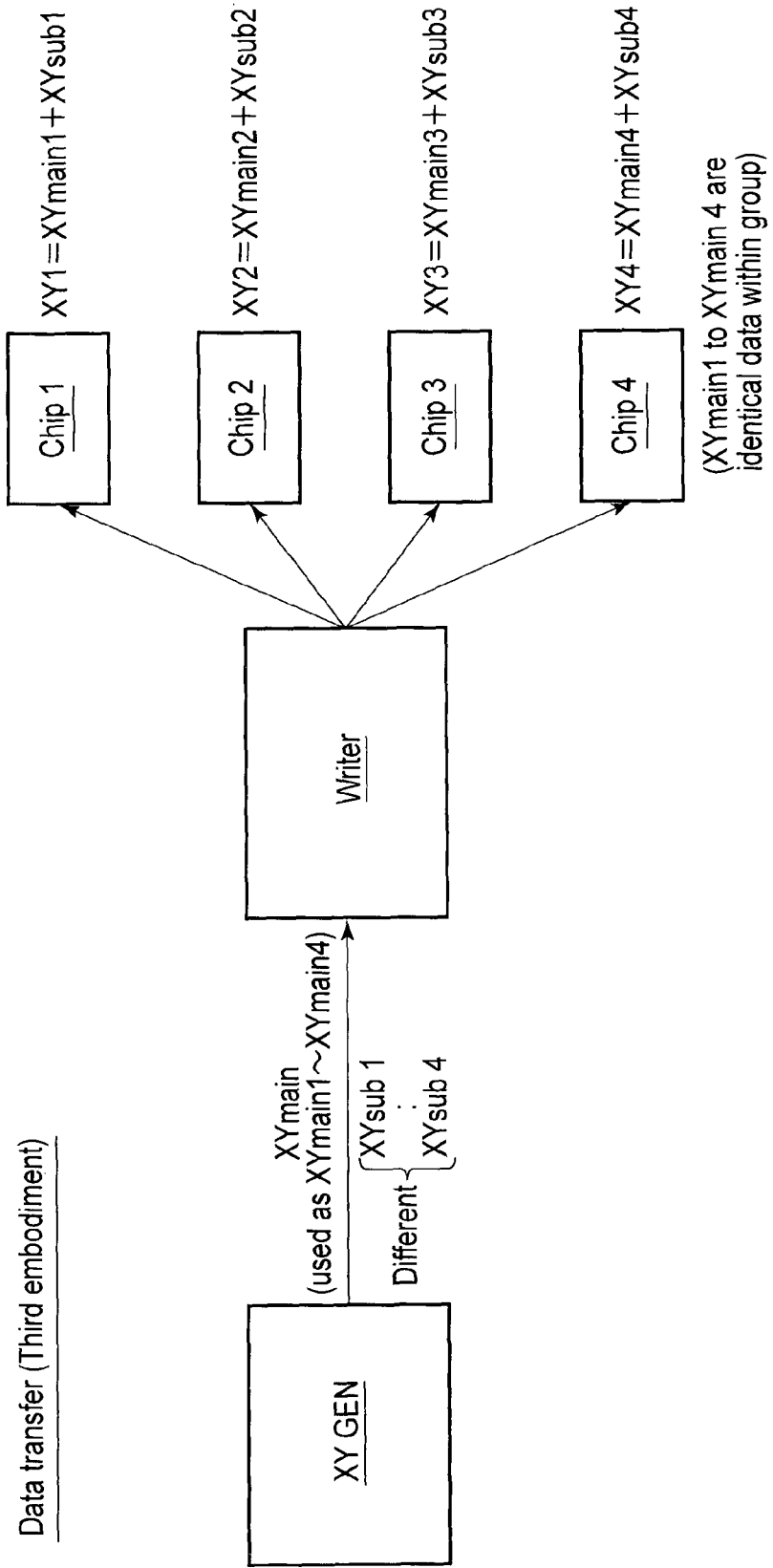
F I G. 9

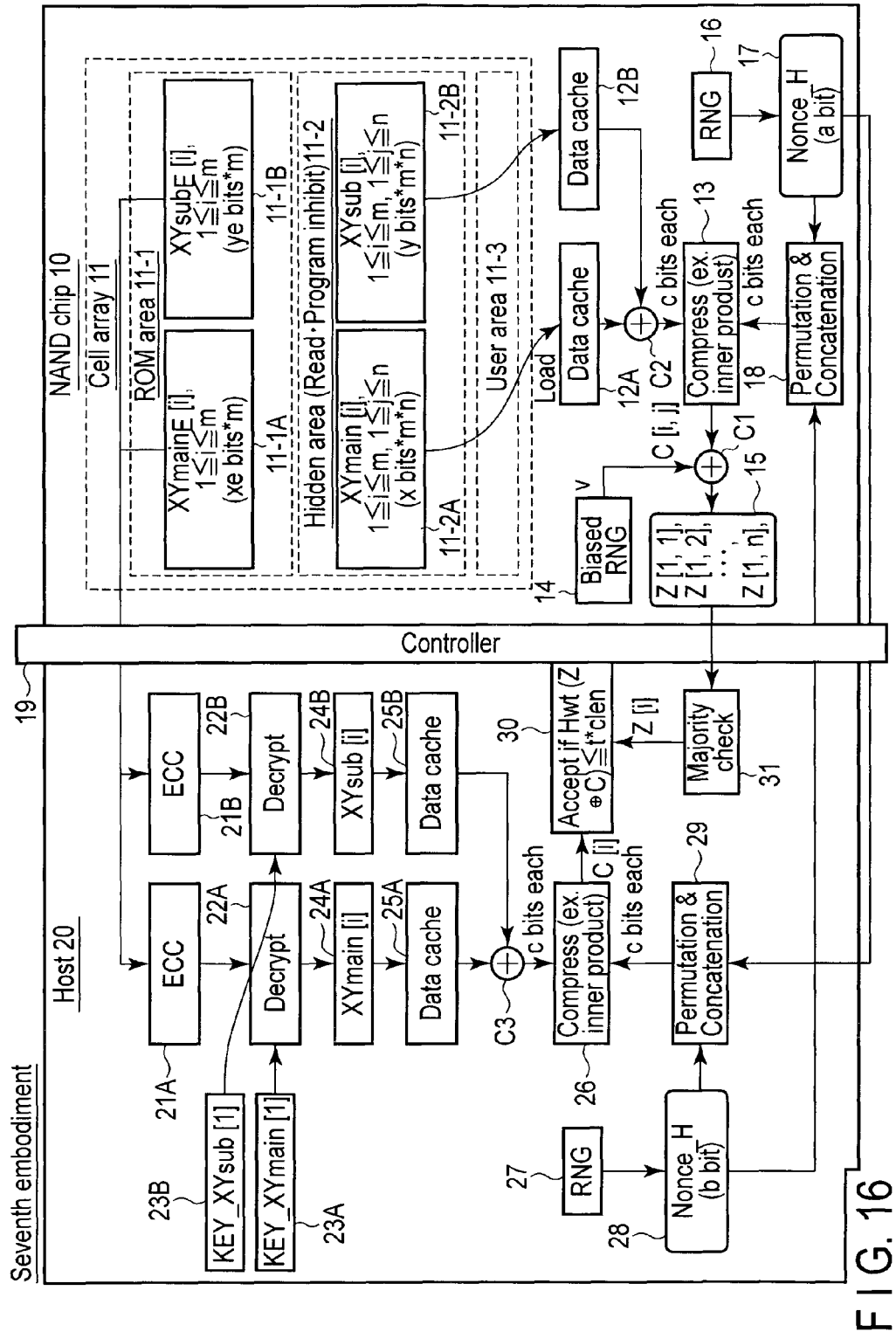
F I G. 16

Eighth embodiment (Media ID retvieval process)

Ninth embodiment (ID binding process)

AUTHENTICATOR, AUTHENTICATEE AND AUTHENTICATION METHOD

CROSS-REFERENCE TO RELATED APPLICATIONS

The present application is a U.S. national phase application under 35 U.S.C. §371 of international application PCT/JP2011/072699 (not published in English), filed Sep. 26, 2011, and claims priority to JP 2011-096499 filed Apr. 22, 2011, the entire contents of each of which are incorporated herein by reference.

TECHNICAL FIELD

Embodiments described herein relate generally to an authenticator, an authenticatee and an authentication method.

BACKGROUND ART

In general, in fields which require security, a method based on a secret, which is shared with an encryptor, is adopted as means for certifying one's own authenticity.

For example, in IC cards, etc., which are used for electronic settlement, an individualized ID and secret information are stored in an IC in the card, and the IC card has a cipher processing function for executing authentication based on the ID and secret information. In another example, there is means for certifying authenticity of an SD card (trademark) in copyright protection of contents.

DISCLOSURE OF INVENTION

According to one embodiment, an authentication method between an authenticatee, which stores secret information XYmain, XYsub, and secret information $XYmain_E$, $XYsub_E$, which is created by encrypting the secret information XYmain, XYsub (data size: XYsub<XYmain, $XYsub_E$<$XYmain_E$), and an authenticator which authenticates the authenticatee, includes: executing, by the authenticator, a decryption process on the secret information $XYmain_E$, $XYsub_E$, which is received from the authenticatee, and sharing the secret information XYmain, XYsub; generating, by the authenticator, secret information XY based on the secret information XYmain, XYsub; receiving, by the authenticatee, a random number B which is generated by the authenticator, and loading the secret information XYmain, XYsub; generating, by the authenticatee, secret information XY based on the secret information XYmain, XYsub; generating, by the authenticatee, a random number A and data v (v having a probability of occurrence of 1 ($\eta$<0.5)); generating, by the authenticatee, a random number D which is composed of at least a part of the generated random number A and the received random number B; generating, by the authenticatee, data C by executing a compression calculated operation with respect to at least a part of the random number D and the secret information XY; transmitting, by the authenticatee, an calculated result Z from the data v and the data C, to the authenticator; generating, by the authenticator, a random number D which is composed of at least a part of the generated random number B and the received random number A; generating, by the authenticator, data C by executing a compression calculated operation with respect to at least a part of the random number D and the secret information XY; and executing, by the authenticator, a determination process by using the received calculated result Z and the generated data C.

BRIEF DESCRIPTION OF DRAWINGS

FIG. 9 is a block diagram showing data transfer of secret information in the third embodiment;

FIG. 16 is a block diagram showing a structure example according to a seventh embodiment;

BEST MODE FOR CARRYING OUT THE INVENTION

Figure 1:
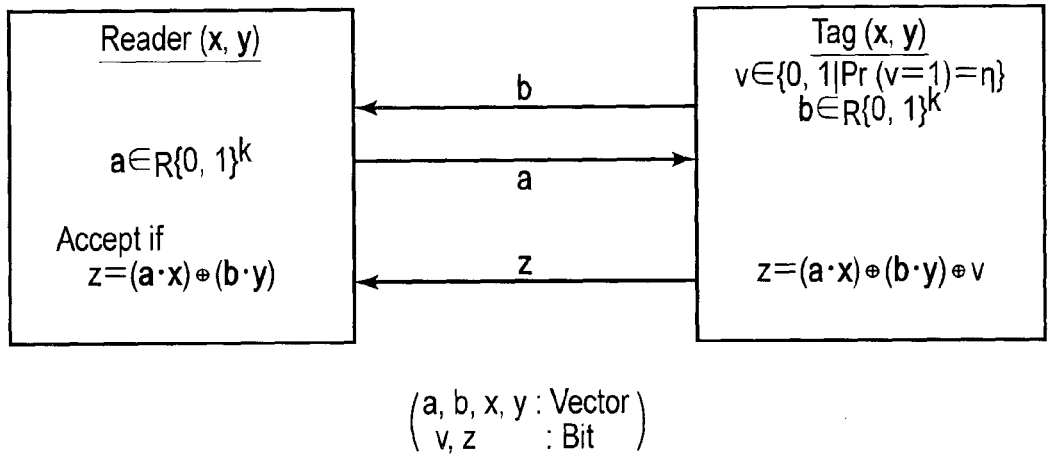
FIG. 1 is a block diagram showing a protocol according to Comparative Example 1.

In the above-described example, it is necessary that an authenticatee include a secret key and an encryptor. However, the implementation of an encryptor requires a relatively large circuit scale. Thus, in an environment in which restrictions to the circuit scale are imposed at the same time, it is very difficult to certify one's own authenticity. A typical example, in which restrictions to the circuit scale are imposed, is RFID (Radio Frequency Identification).

Thus, in recent years, there is a tendency that the need on implementation is increasing.

More concretely, referring to the drawings, comparative examples and embodiments will be described. In the description below, common parts are denoted by like reference numerals throughout the drawings.

Comparative Example 1

An Example of HB+Protocol

To begin with, referring to FIG. 1, Comparative Example 1 is described. Comparative Example 1 relates to an example of HB+Protocol.

The HB+Protocol is an improved protocol of HB Protocol which is a lightweight authentication protocol proposed by Hopper and Blum in the year of 2000. The HB protocol is based on the fact that identification of parity values with noise is difficult (LPN: Learning Parity with Noise), and the security against a passive attack has been proved. However, the HB protocol has a vulnerability to an active attack, such as a disguise of a reader (Reader). In order to solve this problem, the HB+Protocol was proposed by Juels, et al. in 2005.

The outline of the HB+Protocol is as shown in FIG. 1. In FIG. 1, a, b, x and y are vectors, and v and z are bits.

As shown in the Figure, in the HB+Protocol, a tag (Tag), which is an authenticatee (to-be authenticated component), and a reader (Reader), which is an authenticator (authenticating component), share secrete information vectors x and y.

The tag delivers a nonce random number vector b to the reader.

Then, the reader delivers a nonce random number a to the tag.

Subsequently, the tag calculates an inner product (a·x) between the random number a and secret information vector x, and an inner product (b·y) between the random number b and secret information vector y. Further, the tag creates a variable v which becomes 1 with a probability of η. Then, the tag adds the inner product (a·x), the inner product (b·y) and variable v, and calculates $z = ax \oplus by \oplus v$. In this case, ax means the inner product (a·x), and $\oplus$ means an exclusive logical sum.

Then, the tag transmits the calculated z to the reader.

Subsequently, the reader compares the received and $ax \oplus by$, which is calculated by itself, and checks agreement/disagreement. The series of the above processes may be referred to as "1 round".

When the process of 1 round is repeated a plural number of times (e.g. several-ten to several-ten-thousand times), and when the above-described probability of disagreement lowers below a predetermined t, it is regarded that the tag holds secret information, and authentication is successfully executed.

In the meantime, $ax \oplus by$ is the inner product of the secrete information x, y and the binding vector a, b. Thus, if the binding vector xy of x, y is secret information and the binding vector of a, b is Concat(a, b), $ax \oplus by$ may be expressed as Concat(a, b) xy.

Comparative Example 2

An Example of Random HB#Protocol

Figure 2:
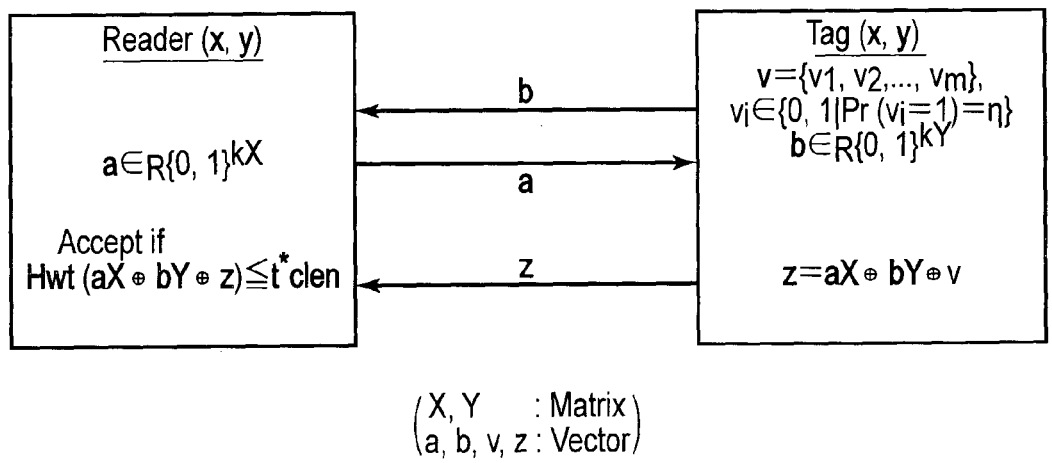
FIG. 2 is a block diagram showing a protocol according to Comparative Example 2.

Next, referring to FIG. 2, Comparative Example 2 is described. Comparative Example 2 relates to an example of Random HB#Protocol. The Random HB#Protocol is a protocol which is a further improvement of the HB+Protocol shown in the above-described Comparative Example 1.

Although the above-described HB+Protocol provides solutions to the passive attack and active attack, there is a tendency that the HB+Protocol has a vulnerability to a man-in-the-middle attack. In order to resolve this issue, the Random HB#Protocol was proposed by Gilbert, et al., as an improved protocol of HB+Protocol.

The outline of the Random HB#Protocol is as shown in FIG. 2. In FIG. 2, X and Y are matrices, and a, b, z, and v are vectors.

As shown in FIG. 2, in the Random HB#Protocol, a tag (Tag) and a reader (Reader) share secrete information matrices x and y.

To begin with, the tag delivers a nonce random number vector b to the reader.

Then, the reader delivers a nonce random number a to the tag.

Subsequently, the tag calculates an inner product (aX) between the random number a and secret information matrix X and an inner product (bY) between the random number b and secret information vector Y. In this case, since X and Y are matrices and a and b are vectors, each internal product result is a vector. Further, the tag creates a variable v which becomes 1 with a probability of η. Then, the tag adds the above-described value, and calculates $z = aX \oplus bY \oplus v$. In this case, z is a vector.

Then, the tag transmits the calculated z to the reader.

Subsequently, the reader executes bit addition between the received z and $aX \oplus bY$ calculated by itself, that is, calculates a Hamming weight Hwt $(aX \oplus bY \oplus z)$ of $aX \oplus bY \oplus z$ by using a result of an exclusive OR operation. When the Hamming weight Hwt$(aX \oplus bY \oplus z)$ lowers below a predetermined value t*clen, it is regarded that the tag holds secret information, and authentication is successfully executed.

In the meantime, $aX \oplus bY$ is the inner product between the binding matrix of the secrete information pieces X and Y and the binding vector of a and b. Thus, if the binding matrix XY of X and Y is secret information and the binding vector of a and b is Concat(a, b), $aX \oplus bY$ may be expressed as Concat(a, b)XY.

<Points of Improvement on Implementation>

In the protocols of the above-described Comparative Examples 1 and 2, however, for example, when the protocols are to be implemented on a NAND flash memory, etc., the following points (I) to (IV) of improvement are thinkable.

(I) Sharing Means of Secret Information Pieces X and Y

As described above, in the above-described Comparative Examples 1 and 2, the reader and the tag need to share the secret information X, Y. However, Examples 1 and 2 fail to preset concrete sharing methods for sharing the secret information X, Y.

Thus, in the case where all readers and tags share the same X, Y in advance, if X, Y is once exposed, the entire system would be fatally affected. On the other hand, in the case where different information X, Y is applied to each tag, the reader side is requested to access, e.g. a database which stores X and Y which are applied to all tags or totally manages X and Y.

As a result, a load on the reader side increases.

As related prior art, Jpn. Pat. Appln. KOKAI Publication No. 2000-357213 proposes a method of mutual authentication between a recording device which records duplicate content in a recording medium having an arithmetic processing function, and the recording medium. The recording medium stores at least first information which depends on the recording medium, and second information which depends on the recording medium and is to be shared with the recording device at a time of executing mutual authentication with the recording device. Based on the first information obtained from the recording medium, the recording device generates authentication information which is used when mutual authentication with the recording medium is executed. Mutual authentication between the recording device and the recording medium is executed by using the generated authentication information and the second information.

(II) Means for Efficiently Recording Secret Information Pieces X and Y in Component P In the above-described HB+Protocol and Random HB#Protocol, a commensurate secrete information amount, i.e., a commensurate data size of X, Y, is necessary in order to make it difficult to identify the above-described LPN problem with a practical calculation amount. If X, Y is common to all tags, hardwired log implementation is possible. However, when X, Y is varied from tag to tag, the tag needs to have a sufficient memory capacity in order to hold X, Y. At the same time, it is necessary to individually record the data in the tag fabrication, and the recording time is reflected on the fabrication time.

As a result, the cost of the tag increases due to the increase in memory capacity and the increase in recording time.

(III) Means for Protection Against Damage of Secret Information Pieces X and Y Stored in Component P In the case where the component P stores X, Y in an internal memory, when X, Y is used for authentication, the data completeness of X, Y is required. However, the prior art is silent on this. In order to ensure the data completeness, such a method is thinkable that X, Y, to which an error correction code is added, is stored in the internal memory of the tag, and a correction process is executed at the time of authentication. However, in general, inexpensive memories do not always have a correction function. When the memory does not have the correction function, the correction function needs to be provided as a component in the tag, other than the memory.

As a result, the cost of the tag increases.

(IV) Secret Information Update Means at Time of Exposure of Secret Information Pieces X and Y The above-described Random HB#Protocol is recognized as having the resistance to the passive attack, active attack and main-in-the-middle attack under predetermined conditions. However, in recent years, the vulnerability to a generalized man-in-the-middle attack has been reported, and the possibility of exposure of X, Y cannot be excluded. Although a commensurate attack cost is required for exposure of X, Y, if X, Y is once exposed, the fabrication of falsified tags using the X, Y becomes possible. Thus, means for updating secret information is desirable in order to transition to new X, Y even when X, Y has been exposed.

Taking the above into account, embodiments are described below with reference to the drawings. The reader and tag of RFID have been described above by way of example. However, the same requirements apply to a memory chip, such as a NAND flash memory, in which the circuit area is directly related to the cost. Thus, in the embodiments below, examples are described in which a host device (Host) which authenticates a NAND flash memory is used as a reader (Reader) functioning as an authenticator, and a NAND flash memory (NAND chip) is used as a tag (Tag) functioning as an authenticatee. However, the embodiments are not limited to these examples. For example, the embodiments are applicable to various implementation modes, such as a NOR flash memory, a resistive random access memory (ReRAM), a magnetoresistive random access memory (MRAM), a phase change random access memory (PRAM), a ferroelectric random access memory (FeRAM), a storage device with an arithmetic function and a memory, such as a hard disk drive or a solid-state drive, a component requiring authentication such as an RFID or IC card, and a system comprising a computer including a general-purpose arithmetic element and a general-purpose memory, and software. In the description below, common parts are denoted by like reference numerals throughout the drawings.

First Embodiment

Next, a description is given of an authenticator, an authenticatee and an authentication method according to a first embodiment.
<1. Structure Example (Memory System)>

Figure 3:
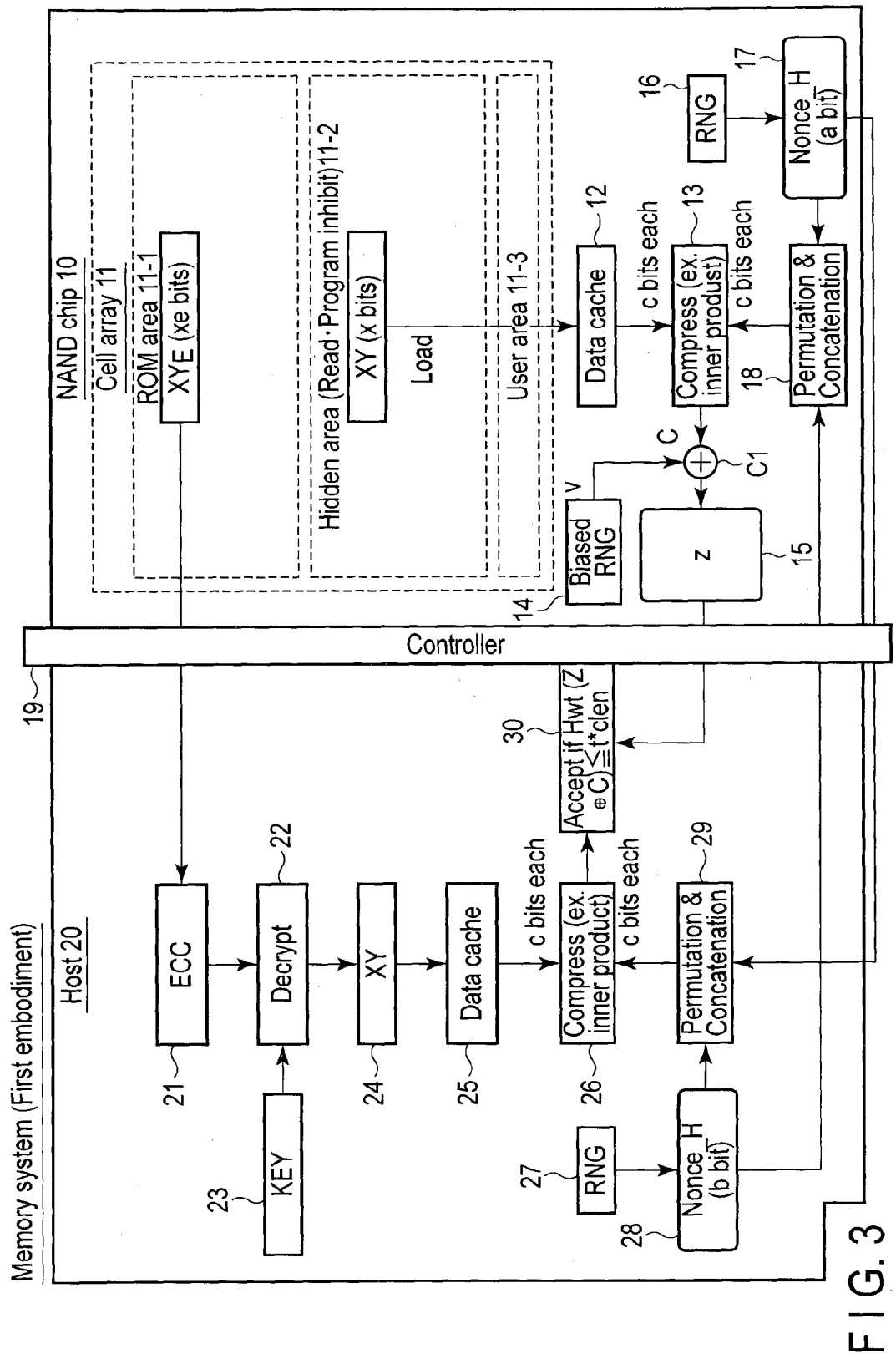
FIG. 3 is a block diagram showing a structure example according to a first embodiment.

To begin with, referring to FIG. 3, a structure example according to the first embodiment is described.

A memory system shown in FIG. 3 includes a NAND flash memory 10 which is an authenticatee, a host device 20 which is an authenticator, and a controller 19 which mediates between both. As shown in FIG. 3, the host 20 accesses the NAND flash memory via a device called "controller 19", which has a function of accessing the NAND flash memory 10.

A fabrication process of a semiconductor product is described. The fabrication process of a semiconductor product is mainly divided into a pre-process of forming a circuit on a substrate wafer, and a post-process of dicing the wafer into pieces and performing wiring and resin package sealing. In this case, the controller 19 is variously configured, for example, such that the controller 19 is included in the NAND flash memory 10 in the pre-process, the controller 19 is not included in the pre-process but is included in the same package in the post-process, or the controller 19 is formed as a chip which is different from the NAND flash memory 10. In the Figures including FIG. 3, the case is described, by way of example, in which the controller 19 is formed as a chip different from the NAND flash memory 10. However, the present embodiment is applicable to any of the above cases. In the description below, unless otherwise specified, the controller mediates, in many cases, in the transactions data and instructions between the host device 20 and NAND flash memory 10, but a description of this will be omitted. Structure examples of the NAND flash memory 10 and controller 19 will be described later.

The respective components and data processing, illustrated in FIG. 3, will be described below. As shown in the Figure, a method of sharing secret information X, Y and a structure in the case of applying this method to the NAND flash memory 10 are illustrated.
1-1. NAND Flash Memory The NAND flash memory 10 is an authenticatee. The NAND flash memory 10 according to this example includes a cell array 11, a data cache 12 which is disposed in a peripheral area of the cell array 11, a compression arithmetic circuit 13, a biased RNG 14, an output module 15, a random number generator 16, a permutation & concatenation circuit 18, and a bit-by-bit addition circuit C1.

In the cell array (Cell array) 11, a plurality of memory cells are arranged in a matrix at intersections between bit lines and word lines (not shown). The memory cell includes, in the named order on a semiconductor substrate, a tunnel insulation film, a floating gate, an interlayer insulation film, and a control gate connected to the word line. Current paths of memory cells in the bit line direction are connected in series, thereby constituting a cell unit. The cell unit is selected by a select transistor which is connected to the bit line and a source line. A plurality of memory cells in the word line direction constitute 1 page (Page) which is a unit of data read and data write. In addition, a plurality of pages constitute a block (Block) which is a unit of data erase.

The cell array (Cell array) 11 includes a ROM area 11-1, a hidden area 11-2 and a user area 11-3.

The ROM area (ROM area) 11-1 is an area in which data record is prohibited and data read is permitted. In the ROM area 11-1 according to this example, data $XY_E$(xe bits), which is obtained by encrypting secret information XY and further adding a correction code to the encrypted secret information, is recorded. For the encryption, use may be made of an encryptor of, e.g. AES (Advanced Encryption Standard), which is a symmetric key cipher. As the encryption mode, use may be made of CTR (Counter), CBC (Cipher block chain), etc. In addition, use may be made of ECDSA (elliptic curve cipher) or RSA, which is an asymmetric cipher. Besides, as the error correction code, use may be made of a BCH code, a Reed Solomon code, LDPC (Low density parity check) code, etc. In this manner, the present example is applicable to any encryption method and any correction code. In this case, $XY_E$ is expressed as data which is obtained by encrypting secret information XY and further adding a correction code to the encrypted secret information. In addition, (xe bits) represents a bit number.

The hidden area (Hidden area) 11-2 is an area in which the outside of the NAND flash memory 10 is prohibited from data record, and in which data read is prohibited (Read Program inhibit). In the hidden area 11-2 according to this example, data XY corresponding to X, Y for use in the authentication is recorded.

The user area (User area) 11-3 is an area in which data record and data read can be freely executed. In the user area 11-3, for example, image data such as photos, and moving picture data are recorded.

The above-described ROM area, hidden area and user area may be realized by making physical structures different, or may be realized by logical control within the NAND flash memory, with the physical structure being the same. In this case, the logical control is, for example, such a method that the respective areas are provided with identifiers which control access from the outside of the NAND flash memory, these identifiers are stored, and access control is executed by the identifiers when the NAND flash memory has received access to the areas from the outside.

In addition, each of the memory cells constituting the cell array (Cell array) 11 may be a memory cell which stores a plurality of bits (MLC: Multi Level Cell) or a memory cell which stores 1 bit (SLC: Single Level Cell). Further, the ROM area and hidden area may be configured to be used by the SLC, and the user area may be configured to be used by the MLC. At this time, the physical structure of the cell array may be different between the SLC area and the MLC area, or only partial bits of the memory cell, which is usable as the MCL, may be utilized as a pseudo-SLC area.

The data cache (Data cache) 12 temporarily stores data which has been read out from the cell array 11.

The biased RNG (Biased RNG) 14 generates a random number v which becomes 1 with a predetermined probability η. In the meantime, the random number generator, which is described below, may be used as an input source of the biased RNG. In this case, a random number corresponding to the probability η can be generated by executing an arithmetic operation, such as AND or OR, on a plurality of random number sequences which are output from the random number generator.

The random number generator (RNG: Random Number Generator) 16 generates a random number Nonce_N (a bit) which is used in authentication.

The permutation & concatenation circuit (Permutation & Concatenation) 18 generates a random number Nonce (c bits) which is constituted from a random number Nonce_H that is input from the host 20, and a random number N that is input from the memory 10, by using XY which is shared by both. In this case, a means a bit length of Nonce_N, b means a bit length of Nonce_H, and c means a bit length which is input per 1 process of the compression arithmetic circuit. Specifically, an individual random number Nonce, which is output from the permutation & concatenation circuit (Permutation & Concatenation), is data for 1 process of the compression arithmetic circuit, and total bits of Nonce_N and Nonce_H may be used for 1 process or parts thereof may be used selectively.

The compression arithmetic circuit (Compress (ex. inner product)) 13 executes a predetermined arithmetic operation, such as an inner product arithmetic operation, with respect to the output XY (c bit each) of the data cache 12 and the output (c bits) of the permutation & concatenation circuit 18, and outputs data C.

The bit-by-bit addition circuit C1 outputs, to the output module 15, Z=C+v, which is obtained by adding v that has been generated by the biased RNG to the output bit of the compression arithmetic circuit 13. As described above, the bit addition means an exclusive logical sum. Specifically, the bit-by-bit addition circuit outputs an exclusive logical sum of bits of 2 input data.

The output module 15 outputs the result (Z=C+v) of the bit-by-bit addition circuit C1 to the host 20 via the controller 19.

The structural components, such as the data cache 12, other than the cell array 11, may also be disposed in the memory controller 19.

1-2. Host

The host (Host) 20 according to the present example includes a correction process module 21, a decrypt module 22, a key holding module 23, a data temporary storage module 25, a compression arithmetic module 26, a compression arithmetic circuit 26, a random number generator 27, a permutation & concatenation circuit 29, and a determination module 30.

The correction process module (ECC) 21 executes an error correction process (ECC) on the data $XY_E$ which has been read out from the ROM area 11-1 of the NAND flash memory 10.

The decrypt module (Decrypt) 22 decrypts, after the read-out data $XY_E$ has been subjected to the error correction process, the data $XY_E$ by a key (KEY) which is held in the key holding module 23, thereby obtaining XY.

The data temporary storage module (Data cache) 25 temporarily stores the decrypted XY. Thereby, the host device 20 and NAND flash memory 20 can share secret information XY.

The compression arithmetic circuit (Compress (ex. inner product)) 26 executes a predetermined arithmetic operation, such as an inner product arithmetic operation, with respect to the output (c bit each) of the data cache 25 and the output (c bits) of the permutation & concatenation circuit 29, and outputs data C.

The random number generator (RNG) 27 generates a random number Nonce_H (b bit) of the host.

The permutation & concatenation circuit (Permutation & Concatenation) 29 generates a random number Nonce (c bits) which is constituted from a random number Nonce_H that is input from the host 20, and a random number N that is input from the memory 10, by using XY which is shared by both.

The determination module (Accept if Hwt(Z⊕C)≤t*clen) 30 calculates a Hamming weight Hwt(Z⊕C), as described above, with respect to the output C of the compression arithmetic module 26 and the output Z of the output module 15. When the Hamming weight Hwt(Z⊕C) becomes lower than the predetermined value t*clen, the determination module 30 regards that the secret information is held, and determines the success of authentication. It is assumed that t<0.5, and clen is the bit length of Z⊕C.

In this manner, the host 20, excluding the biased RNG process 27, confirms the authenticity of the NAND flash memory 10 that is the authenticatee, by the determination module 30 comparing C and Z which have been obtained by the same process.

Meanwhile, the same process by the above-described structure may be executed a plural number of times, and thereby the authenticity may be finally confirmed. For example, in the present Figure, the case in which C is plural bits is illustrated by way of example, and the comparison determination method employs, in the determination, the Hamming weight in the addition bit sequence of Z and C. If C is a single bit, the above-described process needs to be executed a plural number of times, like the above-described HB+Protocol. In this case, like the HB+Protocol, it should suffice if the ratio of disagreement between Z and C is checked based on the probability of occurrence of an error variable.

1-3. Modification

Aside from the above, the structure of this embodiment may be modified, where necessary, as will be described below.

The compression process may correspond to the inner product calculation according to Comparative Examples 1 and 2 shown in FIG. 1 and FIG. 2, but may not necessarily correspond to the inner product calculation. For example, in the compression process, data based on XY and data based on Nonce_H and Nonce_N may be input to the arithmetic device which is composed of an LFSR (Linear Feedback Shift Register), and a part or all of the register values in the LFSR after the input may be used as a compression result. Alternatively, a CRC arithmetic device may be used as the LFSR. Further, a hash function may be used as a function which is used for the compression process. The hash function may be, or may not be, based on an encryptor. No matter which arithmetic method is used, the method proposed in this embodiment is applicable.

There is no difference in belonging to the LPN problem that is the basis of security. The compression process may be lossless compression or lossy compression. The compression process means a process of outputting data which is, at least, smaller than input data, and depends on the input data.

A description is given of a process of sending Nonce which is generated based on Nonce_H and Nonce_N. Nonce is data which is generated by binding Nonce_H and Nonce_N in a predetermined order, and is then sent.

The binding/sending method may be a simple forward-feed data binding/sending method, or an interleave data binding/sending method in which mutual data is alternately inserted. Data may be sent a plural number of times by the above-described method. In any case, Nonce is data which is generated from at least a part of Nonce_N and Nonce_H, and is data with c bit length.

It is assumed that the data length of Nonce_N is a, the data length of Nonce_H is b, and the total data length of both is d. If c=d and data is not sent a plural number of times, the output from the compression calculation module is 1 bit. If c=d and data is sent a plural number of times, the output from the compression calculation module is such that 1 bit is sent a plural number of times. If c<d and data is sent a plural number of times, the output from the compression calculation module is such that 1 bit is sent a plural number of times.

On the other hand, as regards XY with respect to which compression with Nonce is calculated, data in XY is sent to the compression calculation module in units of c bit. The bit size x of XY data is equal to c or an integer number of times of c. When the bit size x is equal to c, the output of the compression calculation module is 1 bit. When the bit size x of XY data is an integer number of times of c, the output of the compression calculation module is such that 1 bit is output a plural number of times. Typical combinations are as follows:

In case of c=d=x, the output of the compression calculation module is 1 bit,

In case of c=d<x, the output of the compression calculation module is a plural number of times of 1 bit, and In case of c<d, and c<x, the output of the compression calculation module is a plural number of times of 1 bit. In the meantime, the above example relates to the case in which the compression calculation module compresses 2 inputs to 1 bit. In the case where the compression calculation module compresses 2 inputs to plural bits, the output value itself per one time becomes plural bits.

<2. Authentication Flow>

Figure 4:
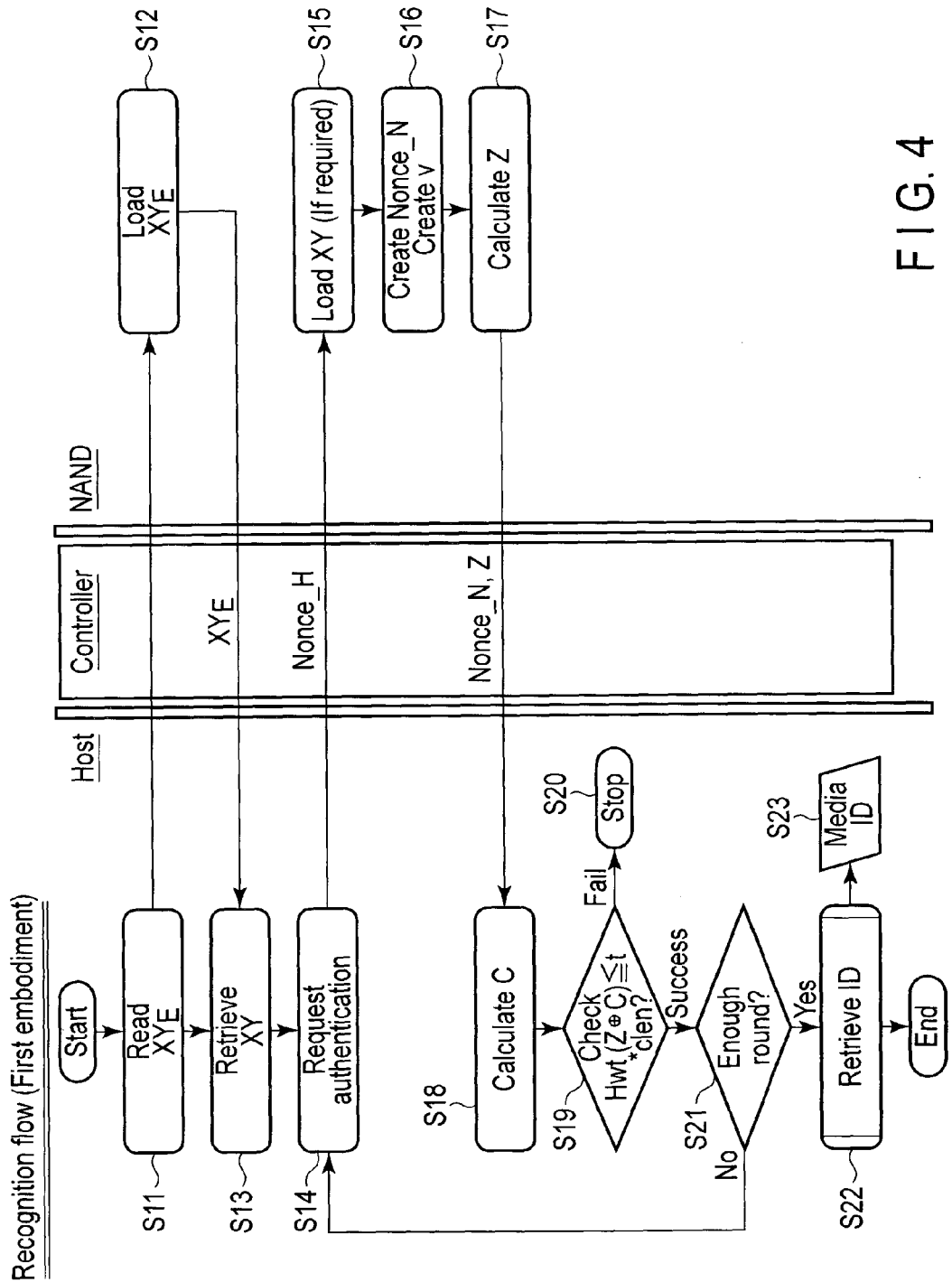
FIG. 4 is a flow chart illustrating an authentication flow according to the first embodiment.

Next, referring to FIG. 4, a description is given of an authentication flow of the memory system having the structure shown in FIG. 3.

If authentication is started (Start), the host device 10, in step S11, sends a read instruction (Read $XY_E$) of $XY_E$ to the NAND flash memory 10.

Then, in step S12, the NAND flash memory 10 loads $XY_E$ (load $XY_E$) from the cell array 11-1 according to the read instruction, and sends this to the host device 20.

Subsequently, in step S13, the host device 20 executes the above-described decrypt process on the received $XY_E$, and retrieves XY (Retrieve XY).

Then, in step S14, the host device 20 sends an authentication request (Request authentication) to the NAND flash memory 10. In this case, the authentication request may include Nonce_H.

Thereafter, in step S15, the NAND flash memory 10 receives Nonce_H, and loads XY (Load XY (if required)).

Then, in step S16, the NAND flash memory 10 creates Nonce_N and v (Create Nonce_N, Create v).

Subsequently, in step S17, the NAND flash memory 10 adds v, as described above, and calculates Z. The NAND flash memory 10 sends Nonce_N and Z to the host 20.

Then, in step S18, after receiving Nonce_N and Z, the host 20 executes a predetermined arithmetic operation such as an inner product arithmetic operation, and calculates data C.

Subsequently, in step S19, the host 20 calculates a Hamming weight Hwt(Z⊕C) with respect to the sequence of bit-by-bit XOR values of Z and C, and executes a determination process to determine whether the Hamming weight Hwt(Z⊕C) is lower than a predetermined value t*Clen (Check Hwt(Z⊕C)≤t*Clen). As described above, t is a value based on an error addition probability (or a probability of occurrence of 1 in data) η in an error bit or an error vector which was used by the NAND flash memory 10 at the time of calculating Z, and it is assumed that η≤t<0.5. In addition, it is assumed that clen is the bit length of C.

Subsequently, in step S20, when the determination result in step S19 fails to become lower than the predetermined value (Fail), the host 20 determines failure and stops the operation.

Then, in step S21, when the determination result in step S19 is lower than the predetermined value (Success), the host 20 determines whether a predetermined round number has been reached (Enough round?). The round number, in this context, refers to a series of processes from the authentication request process to the determination process. If the round number is not reached (No), the authentication request process (S14~) is repeated.

Subsequently, in step S22, when the round number is reached (Yes), the host device 10 regards that the authentication has been successfully executed, and executes, where necessary, a process of calculating Media ID, based on the XY. The calculation process of Media ID and the method of using Media ID (S23 and the following) will be described later.

By the above-described operation, the authentication flow according to the first embodiment is finished (End).

In the meantime, it is necessary to use different parameters of Nonce_N, Nonce_H and v between the respective rounds. In addition, when the NAND flash memory 10 has received an authentication request, if XY at the time of the previous authentication request remains loaded in the Data Cache, it is possible to omit the loading of XY from the cell array, and to use the values in the Data Cache. In addition, after step S17, the XY in the Data Cache may be erased. In particular, in the case where the NAND flash memory 10 provides to the outside the function of accessing the Data Cache, it is useful, in terms of security, to erase the secret information in the Data Cache at a stage when the data Z that is necessary for authentication has been calculated.

<3. Advantageous Effects>

According to the structure and the authentication method relating to the first embodiment, the above points (I) to (IV) can be improved, and at least the following advantageous effect (1) can be obtained.

(1) Different secret information XY can be shared between the authenticator and the authenticatee while the secret state of the secret information XY is maintained, and authentication can be executed by a light amount of calculation based on the shared secret information.

The NAND flash memory 10 according to the present embodiment stores the secret information XY in the hidden area 11-2 that is the record prohibition/read prohibition area, and stores $XY_E$, which is obtained by encrypting the secret information XY and adding the correction code to the encrypted secret information, in the ROM area 11-1 that is the record prohibition/read permission area. Further, the host 20 has the function of reading out the $XY_E$ and executing the error correction process 21 and decryption process 22, and can share the secret information XY between the NAND flash memory 10 and host 20 by the key 23 that is used for decryption. Thus, the authenticator and authenticatees can execute authentication by the shared secret information XY (S11 to S23).

In addition, the NAND flash memory 10 and the host device 20 include the RNG 16, 17 which creates nonce random numbers, the permutation & concatenation module 18, 29, the compression calculation module 13, 26, the bit-by-bit addition module C1, 26 of nonce random numbers, and the output module 15. Furthermore, the NAND flash memory 10 includes the biased RNG 14. The host 20 includes the determination module 30 which compares the Z that is output from the NAND flash memory 10 and the C that is calculated within the host device, thereby executing authentication.

As described above, in the first embodiment, since the secret information XY is stored in the hidden area 11-2 that is the record prohibition/read prohibition area and the data Z is generated by using this information, the secrecy can be secured. Moreover, the $XY_E$, which is obtained by encrypting the secret information XY and adding the correction code to the encrypted secret information, is stored in the ROM area 11-1 that is the record prohibition/read permission area. The host 20 subjects the $XY_E$, which is read out therefrom, to the error correction process 21 and the decryption process 22 using the key 23, thereby sharing the XY. Thus, different secret information XY can be shared between the authenticator and the authenticatee while the secret state of the secret information XY is maintained.

Therefore, according to the structure and the authentication method relating to the first embodiment, different secret information XY can be shared between the authenticator and the authenticatee while the secret state of the secret information XY is maintained, and authentication can be executed by a light amount of calculation based on the shared secret information.

Second Embodiment

Figure 5:
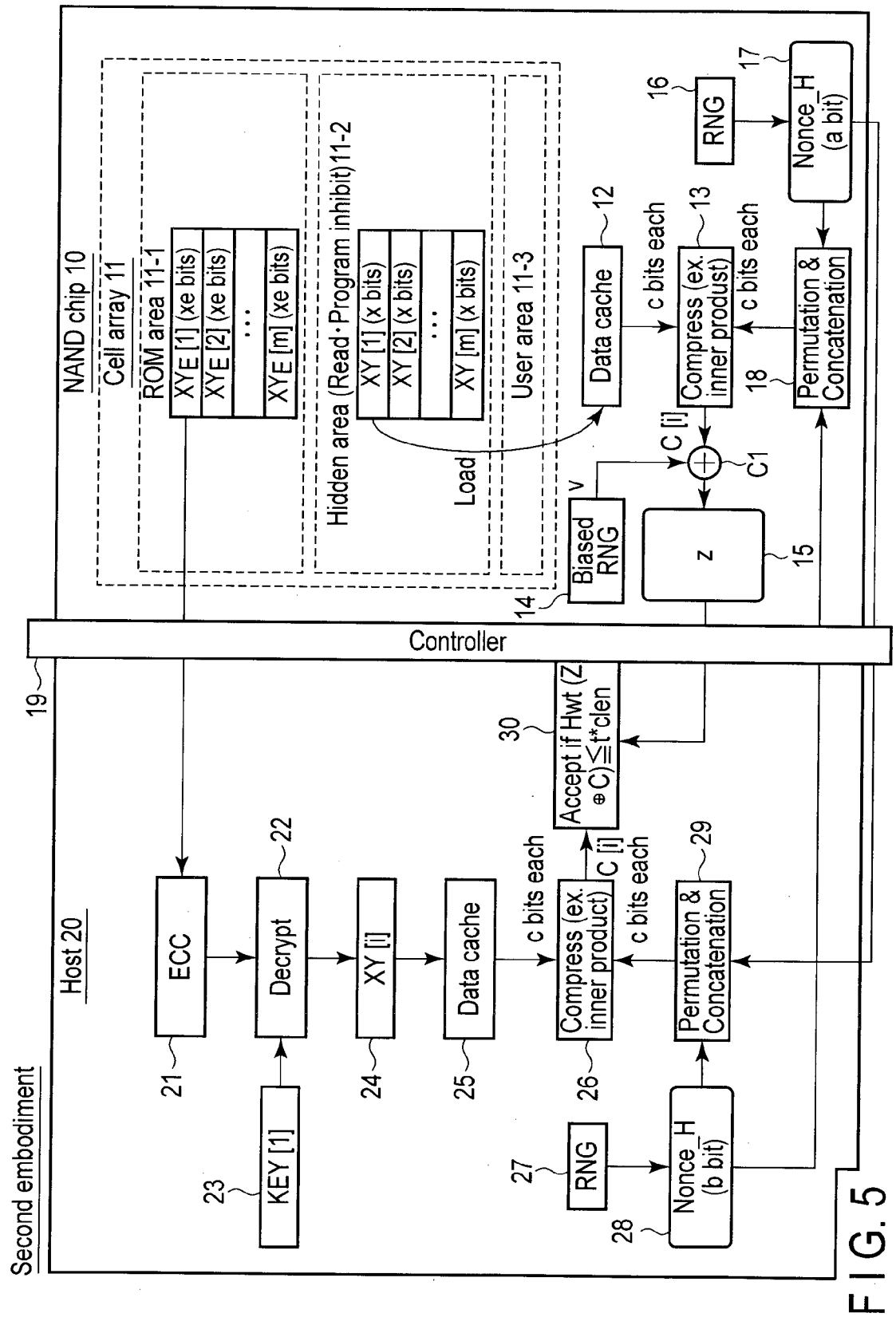
FIG. 5 is a block diagram showing a structure example according to a second embodiment.
Figure 6:
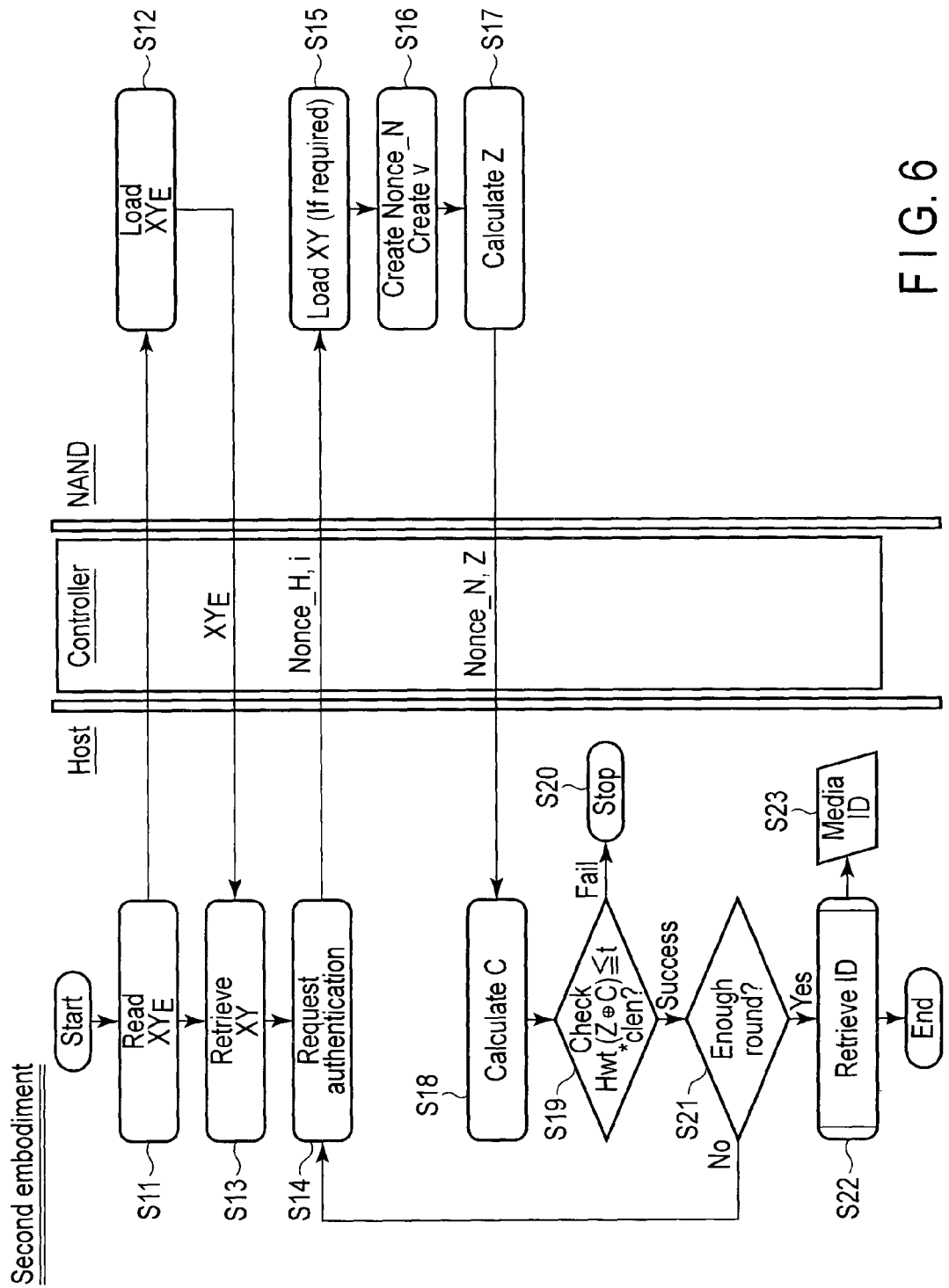
FIG. 6 is a flow chart illustrating an authentication flow according to the second embodiment.

Next, referring to FIG. 5 and FIG. 6, a description is given of authenticator/authenticatees and an authentication method according to a second embodiment. In the description below, a description of parts overlapping the first embodiment is omitted.

<Structure Example (Memory System)>

Referring to FIG. 5, a structure example of the second embodiment is described.

As shown in FIG. 5, the structure example of the second embodiment differs from the first embodiment in that the NAND flash memory 10 stores a plurality of pieces of $XY_E$ and a plurality of pieces of XY in the ROM area 11-1 and hidden area 11-2, respectively. In this example, when i and j are different, $XY[i] \neq XY[j]$, and $XY_E[i] \neq XY_E[j]$.

In this manner, by storing sets of plural $XY_E$ and plural XY, it is possible to provide means for updating secret information when secret information pieces X and Y are exposed. If one set of XY and $XY_E$ is exposed by a man-in-the-middle attack or the like, and a falsified device is fabricated by misappropriating the exposed XY and $XY_E$, it is possible, in the present embodiment, to update the KEY[1]23 that is held by the host 20 (e.g. KEY[1]⇒ updated KEY[2]). In this manner, by using a set other than the set of exposed XY and $XY_E$, it becomes possible to eliminate falsified devices. As regards the KEY that is used for encryption of each XY[i], when i is different, it is preferable to use different KEY.

In the other respects, the second embodiment is substantially the same as the first embodiment, so a detailed description is omitted.

<Authentication Flow>

Next, referring to FIG. 6, the authentication operation according to the second embodiment is described.

In the second embodiment, since the plural XY and plural $XY_E$ are recorded in the NAND flash memory 10, the host 20 selects the XY that is to be used, thereby executing authentication.

Thus, in the second embodiment, in step S14, when the host 20 requests authentication (Request authentication), the host 20 sends a parameter i, which designates the XY that is to be used, together with the random number Nonce_H, to the NAND flash memory 10. In this respect, the second embodiment differs from the first embodiment.

In the other respects, the second embodiment is substantially the same as the first embodiment, so a detailed description is omitted.

<Advantageous Effects>

According to the authenticator/authenticatees and the authentication method relating to the second embodiment, the above points (I) to (IV) can be improved, and at least the above-described advantageous effect (1) can be obtained.

Furthermore, the second embodiment differs from the first embodiment in that the NAND flash memory 10 stores a plurality of pieces of $XY_E$ and a plurality of pieces of XY in the ROM area 11-1 and hidden area 11-2, respectively.

In this manner, by storing sets of plural $XY_E$ and plural XY, it is possible to provide means for updating secret information when secret information pieces X and Y are exposed. If one set of XY and $XY_E$ is exposed by a man-in-the-middle attack or the like, and a falsified device is fabricated by misappropriating the exposed XY and $XY_E$, it is possible, in the present embodiment, to update the KEY[1]23 that is held by the host 20 (e.g. KEY[1]⇒ updated KEY[2]).

Thus, in the authentication flow of the second embodiment, in step S14, when the host 20 requests authentication (Request authentication), the host 20 sends a parameter i, which designates the XY that is to be used, together with the random number Nonce_H, to the NAND flash memory 10.

In the second embodiment, as described above, the NAND flash memory 10 has plural XY and plural $XY_E$, has the function of selectively sending $XY_E$ by an instruction from the host device, and selectively sets the XY that is used for authentication by an instruction from the host device. In addition, the host device has the function of selectively reading out the $XY_E$ which corresponds to the key that is held by the host device itself, has the function of decrypting the $XY_E$, and has the function of updating the key that is held by itself under a predetermined condition.

As a result, by using a set other than the set of exposed XY and $XY_E$, it becomes possible to advantageously eliminate falsified devices.

Third Embodiment

Figure 7:
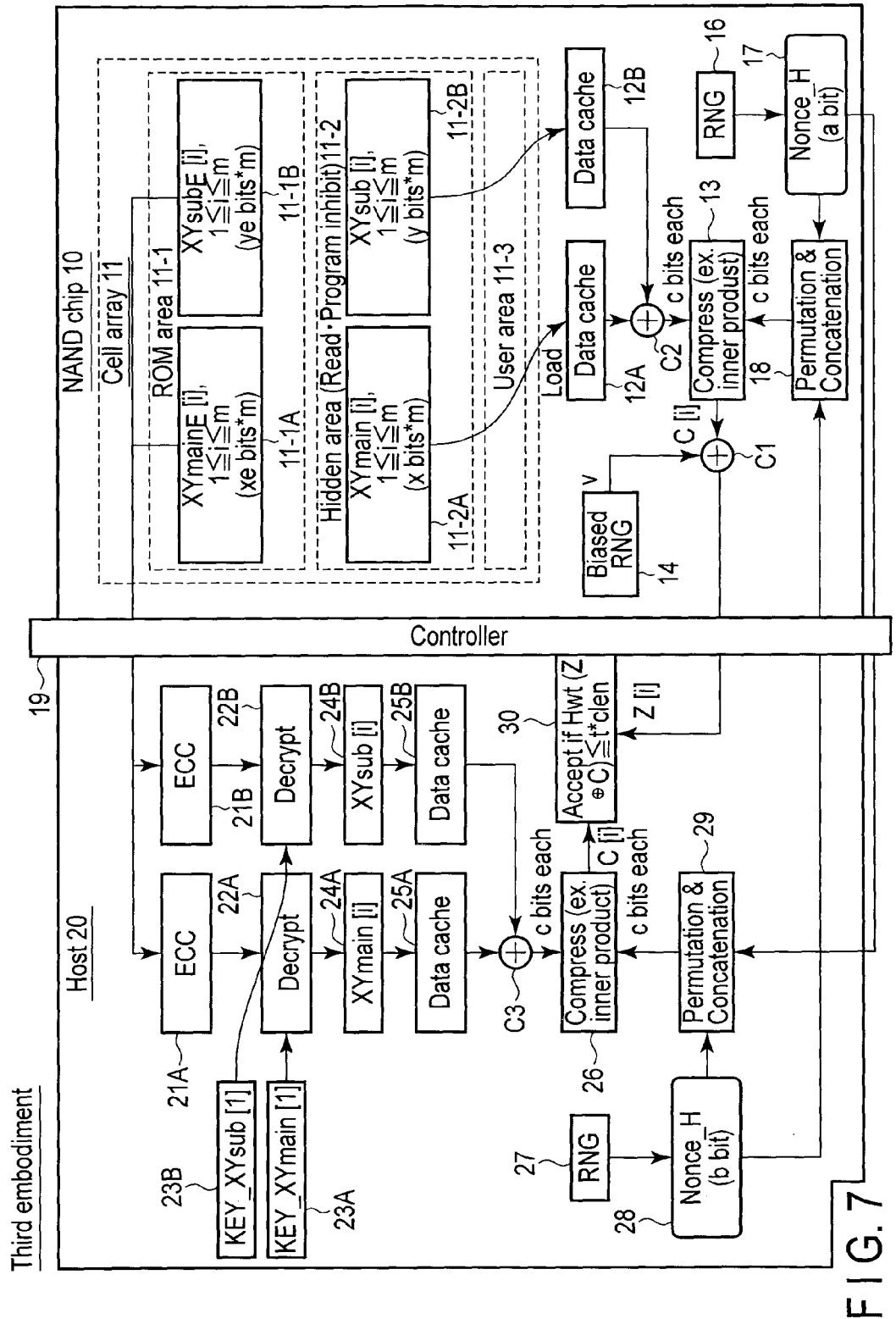
FIG. 7 is a block diagram showing a structure example according to a third embodiment.
Figure 8:
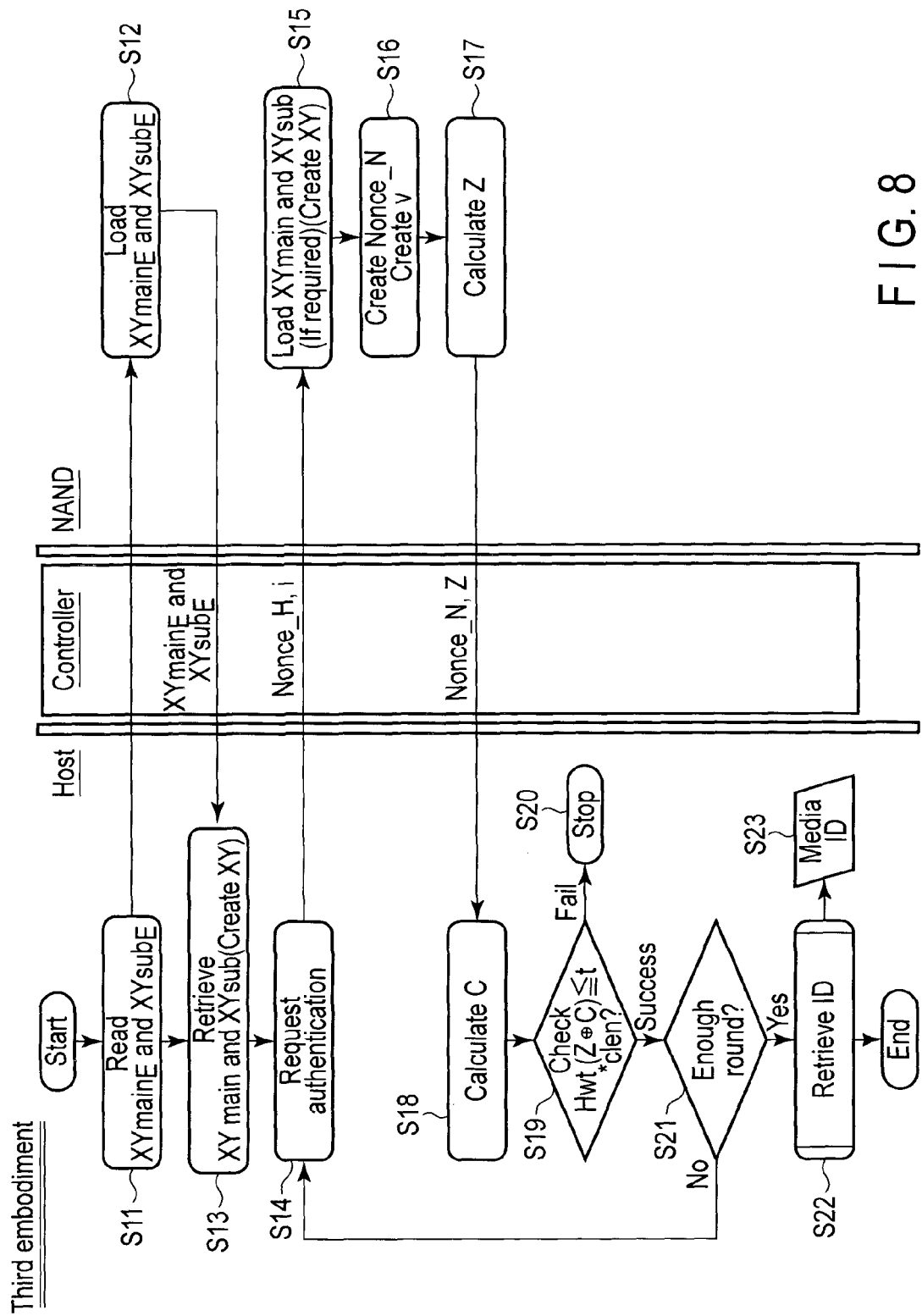
FIG. 8 is a flow chart illustrating an authentication flow according to the third embodiment.

Next, referring to FIG. 7 to FIG. 9, a description is given of authenticator/authenticatees and an authentication method according to a third embodiment.

<Structure Example (Memory System)>

Referring to FIG. 7, a structure example of the third embodiment is described.

As shown in FIG. 7, the third embodiment differs from the second embodiment in that the NAND flash memory 10 stores a plurality of pieces of $XYsub_E$ and a plurality of pieces of XYsub in a ROM area 11-1B and hidden area 11-2B, respectively. In this example, when and j are different, XYsub [i] # XYsub[j], and $XYsub_E[i] \neq XYsub_E[j]$. $XYsub_E$ is data which is obtained by encrypting XYsub and then adding a correction code thereto.

The XYsub, like XY, is recorded in the record prohibition/read prohibition area (hidden area) 11-2B, and $XYsub_E$, like $XY_E$, is stored in the record prohibition/read permission area (ROM area) 11-1B.

The data size of XYmain is greater than that of XYsub (data size: XYmain>XYsub). In addition, the data composed of XYmain and XYsub corresponds to the above-described secret information XY.

In the third embodiment, as described above, since the set of XYsub[i] and $XYsub_E[i]$ is further included in addition to the set of XY, the third embodiment is advantageous in that the secret information X and Y can efficiently be recorded. The details will be described later.

Furthermore, the NAND flash memory 10 includes a data cache 12B for storing the XYsub, and a bit-by-bit addition module C2 for adding XYmain and XYsub on a bit-by-bit basis. The output value of the bit-by-bit addition module C2 corresponds to the above-described XY value that is used for authentication. In this example, since the bit length is different between XYmain and XYsub, repetitive data of XYsub is applied to the bit addition C2.

For example, as shown in the Figure, the bit addition is thinkable as the predetermined arithmetic operation. When the data size of XYmain is an integer number of times of the data size of XYsub, such a configuration is thinkable that the XYmain is successively sent from the Data cache which stores the data of XYmain, and XYsub is successively and repeatedly sent from the Data cache which stores the data of XYsub. The Data cache which stores XYsub may be thought to be a ring buffer. Aside from the bit-by-bit addition, the bound value of XYmain and XYsub may be used as XY, or the interleave bound value of XYmain and XYsub may be used as XY. Besides, XYmain and XYsub may be input to the LFSR and the value of a predetermined register of the LFSR may be used as XY. In short, in the present embodiment, although the bit-by-bit addition module is used, it is possible to apply any of arithmetic methods using the data, which is composed of two inputs, as XY.

Similarly, the host 20 further includes a correction process module 21B, a decrypt module 22B, a key holding module 23B, a data storage module 25B, and an addition module C3, which are adaptive to the read-out $XYsub_E$. By the above structure, the host 20 similarly executes an error correction process, and executes decryption by the corresponding KEY_XYsub, thereby obtaining XYsub. Thus, the secret information XYmain and XYsub can be shared between the host device and the NAND flash memory. Although the KEY_XYmain and KEY_XYsub are depicted as different objects in the Figure, these may actually be the same. As regards the KEY_XYsub that is used for encryption of each XYsub[i}, when i is different, it is preferable to use different KEY_XYsub. Besides, the host device 20 and memory 10 execute the authentication process, based on the XY value which is obtained by executing a predetermined arithmetic operation by using XYmain and XYsub.

<Authentication Flow>

Next, referring to FIG. 8, the authentication operation according to the third embodiment is described.

In the third embodiment, XYsub, in addition to XYmain, is recorded in the NAND flash memory 10, and $XYmain_E$ and $XYsub_E$, which are obtained by encrypting them, are also recorded.

Thus, as shown in the Figure, in the corresponding step S13, the host 10 further reads out $XYmain_E$ and $XYsub_E$, decrypts them, and creates secret information XY based on the secret information XYmain and XYsub (Create XY). Subsequently, the host 20 executes similar authentication by using the information which is derived from the secret information XYmain and XYsub.

Similarly, on the NAND flash memory 10 side, in step S15, secret information XY is created based on the read-out secret information XYmain and XYsub (Create XY). In this respect, the third embodiment differs from the second embodiment.

<Advantageous Effects>

According to the authenticator/authenticatees and the authentication method relating to the third embodiment, the above points (I) to (IV) can be improved, and at least the above-described advantageous effect (1) can be obtained. Further, in the third embodiment, the following advantageous effect (2) can be obtained.

(2) Secret information X, Y can efficiently be recorded, and the recording time can advantageously be shortened.

In the third embodiment, the NAND flash memory 10 has plural XYsub and plural XYsub$_E$, selectively sends XYsub$_E$ by an instruction from the host 20, selectively sets XYsub that is used for authentication by an instruction from the host 20, and executes authentication by the value which is derived by a predetermined arithmetic operation of the selected XYsub and XY.

In addition, the host device has the function of selectively reading out the XYsub$_E$ which corresponds to the key 23B that is held by the host device itself, has the function 22B of decrypting the XYsub$_E$, and has the function of updating the key 23B that is held by itself under a predetermined condition, and executes the authentication 30 by the value which is derived by a predetermined arithmetic operation of the selected XYsub and XYmain.

As described above, since the set of XYsub[i] and XYsub$_E$[i] is further included in addition to the set of XYmain, there is the advantage that the secret information X and Y can be efficiently recorded.

To be more specific, for example, this is illustrated in FIG. 9. As shown in FIG. 9, in the fabrication process of the NAND flash memory, plurality of sets of XYmain, XYmain$_E$, XYsub and XYsub$_E$ are generated by an XY generator (XY GEN), and are written in a plurality of NAND flash memories (in this example, Chip 1 to Chip 4) by a writer (Writer).

In this example, the data of XYmain and XYmain$_E$ may be identical data in a group (e.g. lot) comprising plural chips Chip 1 to Chip 4. On the other hand, the XYsub and XYsub$_E$ need to be different data (XYsub1 to XYsub4, and XYsub$_E$1 to XYsub$_E$4) between the chips Chip 1 to Chip 4.

As described above, in the third embodiment, in the data write operation, the XYmain and XYmain$_E$, the data amount of which is large, are made common between the plural chips Chip 1 to Chip 4. Thereby, the process of data write in the memory can be optimized and the data can be efficiently recorded.

If the XYmain and XYmain$_E$ are structured by hardwired configuration, the actually recorded data are the XYsub and XYsub$_E$, the data amount of which is small, and the recording time can be shortened. If the XYmain and XYmain$_E$ are recorded on the cells, since these are identical in the group, it is possible to shorten the time for transferring record data to a data recording device in the NAND flash memory. As has been described above, since the increase in recording time becomes the increase in cost, the third embodiment has a great merit that the manufacturing cost can be reduced.

Fourth Embodiment

An Example of Multiple Recording

Figure 10:
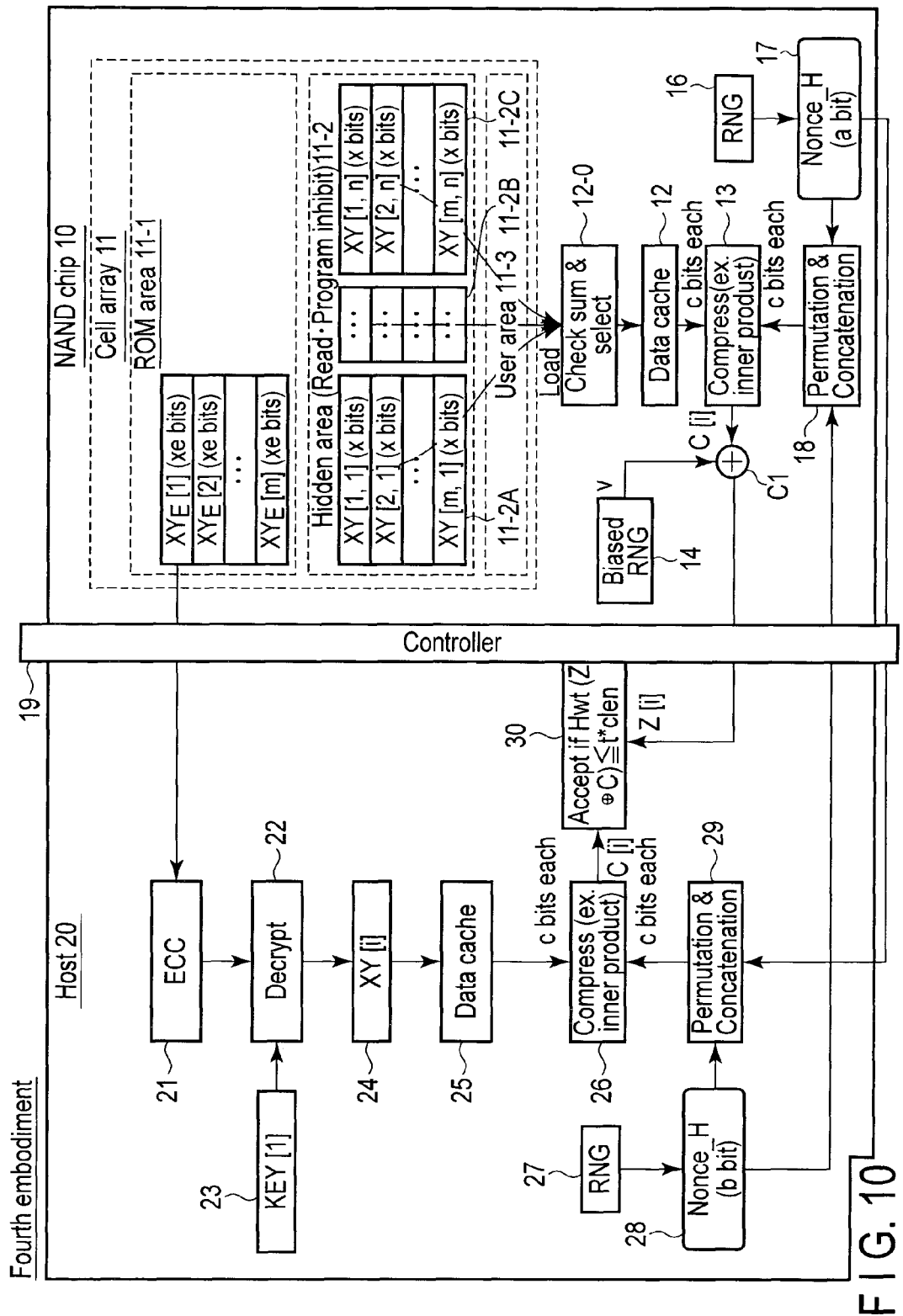
FIG. 10 is a block diagram showing a structure example according to a fourth embodiment.
Figure 11:
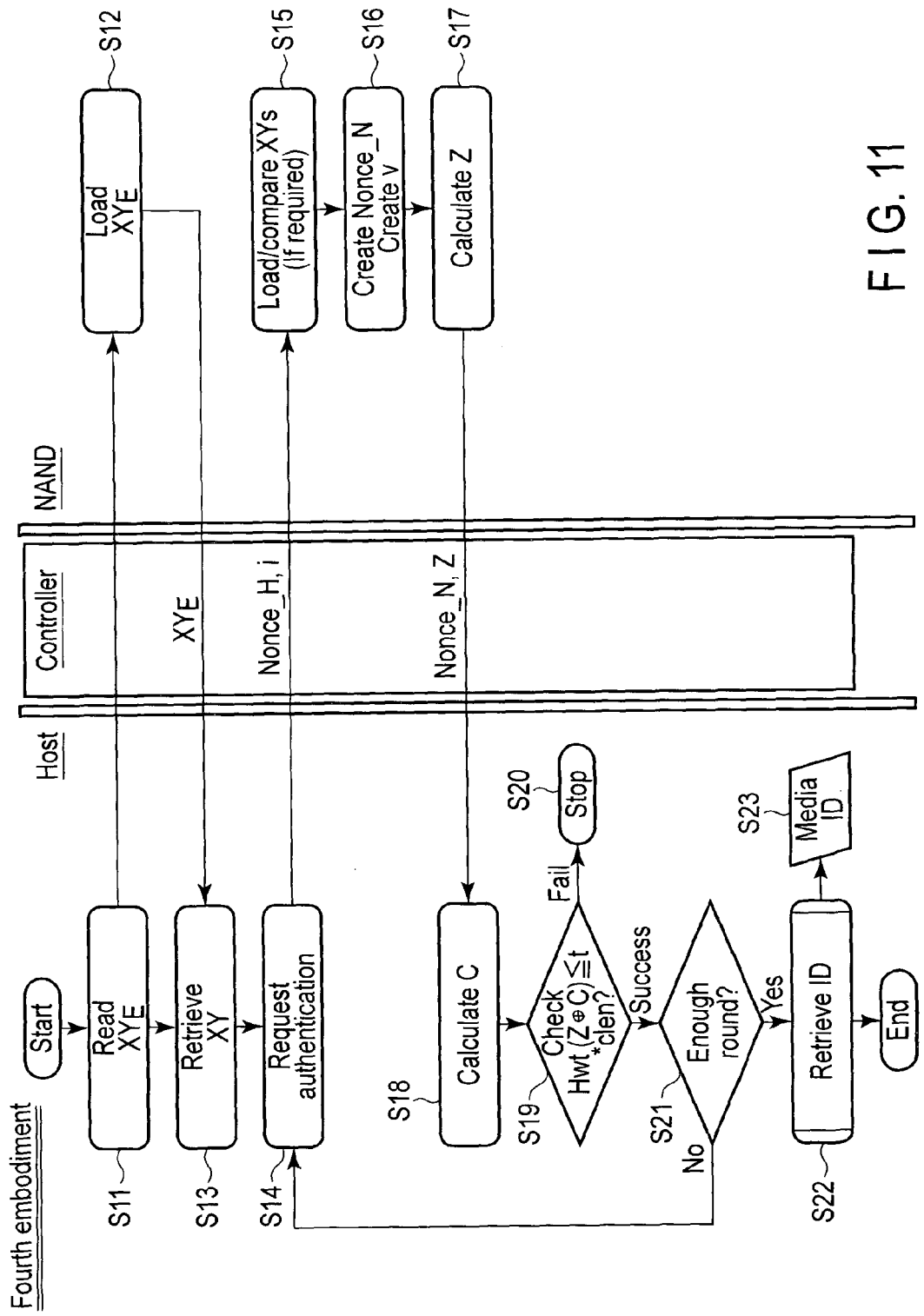
FIG. 11 is a flow chart illustrating an authentication flow according to the fourth embodiment.

Next, referring to FIG. 10 and FIG. 11, a description is given of authenticator/authenticatees and an authentication method according to a fourth embodiment.
<Structure Example (Memory System)>

Referring to FIG. 10, a structure example of the fourth embodiment is described.

The fourth embodiment differs from the second embodiment in that information pieces 11-2A, 11-2B and 11-2C, which are created by multiply duplicating a plurality of XY[i], are further included in the hidden area 11-2 of the memory 10.

Specifically, the data, which are obtained by duplicating XY[i] in the second embodiment, are indicated by XY[i, 1], XY[i, 2], . . . , XY[i, n] in FIG. 10, and XY[i, 1]=XY[i, 2]=, . . . , =XY[i, n], where 1≤i≤m. In addition, XY[1, j]≠XY[2, j]≠, . . . , ≠XY[m, j], where 1≤j≤n.

In this example, while ECC is added to XY$_E$, ECC is not added to XY. Thus, when an error is included in the data that has been read out of the cell in the NAND flash memory, it can be thought that the completeness of the XY, which is used for authentication by the NAND flash memory, is lost. However, as in the present embodiment, since the information pieces 11-2A, 11-2B and 11-20, which are created by duplicating the plural XY[i], are further included, a check sum & select module 12-0 can detect whether the error is included or not, by data comparison between the duplicate data.

Thus, the memory of the present embodiment differs from that of the second embodiment in that this embodiment further includes the check sum & select module (Check sum & select) 12-0 for adapting to the information pieces 11-2A, 11-2B and 11-2C which are created by duplicating the XY[i].

In FIG. 10, a data set of at least two XYs, which are loaded from the cell 11-2, is compared by the same predetermined method as described above, and it is checked whether an error is included or not. If an error is included or if an error cannot be eliminated, a different data set of at least two XYs is loaded once again, and a similar check is executed. This is repeated until no error is included or until a data set, from which an error can be eliminated, is found. When such a data set is found, this is used for authentication. As an example of the predetermined method, such a method is thinkable that two XYs are loaded, and an XOR value is calculated on a bit-by-bit basis, and then a check is executed as to whether all XOR values are 0. Alternatively, such a method is thinkable that three or more XYs are loaded, and XY, from which an error has been eliminated on a bit-by-bit basis by a majority check, is obtained. In addition, although all duplicate data of XY are identical data in this Figure, it is thinkable to adopt such a method that data, which have such a complementary relationship that the polarity of odd-numbered data and the polarity of even-numbered data in the duplicate data are reversed, are formed and recorded in advance. In this case, two XYs having the complementary relationship are loaded, and the XOR value is calculated on a bit-by-bit basis, and then a check is executed as to whether all XOR values are 1.
<Authentication Flow>

Next, referring to FIG. 11, the authentication operation according to the fourth embodiment is described.

As shown in FIG. 11, in the fourth embodiment, a plurality of XYs are multiply recorded in the hidden area 11-2 of the NAND flash memory 10.

Thus, in step S15, the NAND flash memory 10 reads out at least two XYs, compares them, and executes authentication by using the XY which includes no error (Load/compare XYs).
<Advantageous Effects>

According to the authenticator/authenticatees and the authentication method relating to the fourth embodiment, the above points (I) to (IV) can be improved, and at least the above-described advantageous effect (1) can be obtained.

Furthermore, according to the fourth embodiment, information pieces 11-2A, 11-2B and 11-2C, which are created by multiply duplicating a plurality of XY[i], are further included in the hidden area 11-2 of the memory 10.

In this case, while ECC is added to XY$_E$, ECC is not added to XY. Thus, when an error is included in the data that has been read out of the cell in the NAND flash memory, it can be thought that the completeness of the XY, which is used for authentication by the NAND flash memory, is lost. However, according to the fourth embodiment, since the information pieces 11-2A, 11-2B and 11-2C, which are created by duplicating the plurality of XY[i], are further included, the check sum & select module 12-0 can detect whether the error is included or not, by the data comparison between the duplicate data. As a result, even in the case where an error is included in the data that has been read out of the cell in the memory 10, it is possible to advantageously prevent the completeness of the XY, which is used for authentication by the memory 10, from being lost.

Fifth Embodiment

Figure 12:
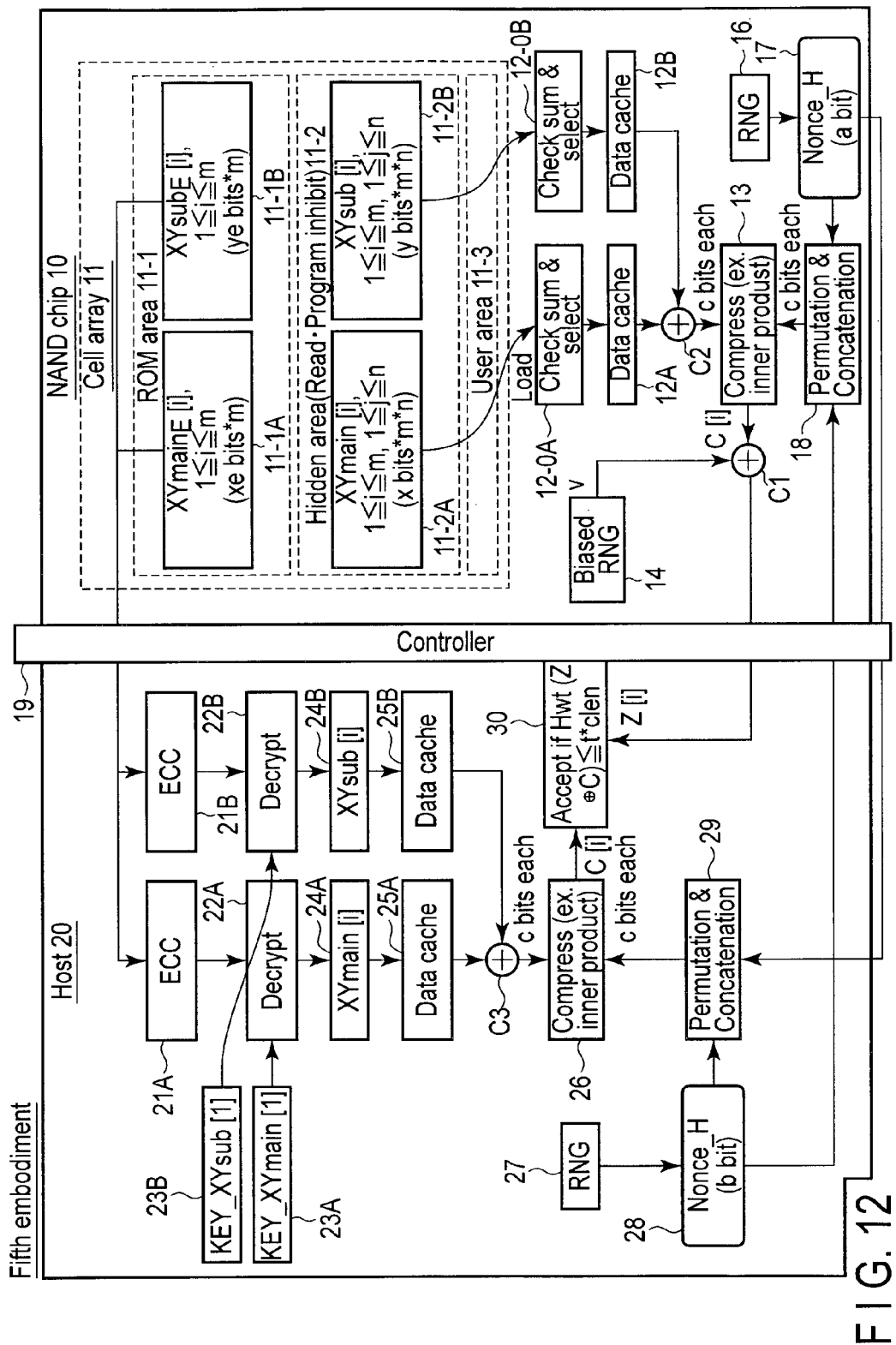
FIG. 12 is a block diagram showing a structure example according to a fifth embodiment.
Figure 13:
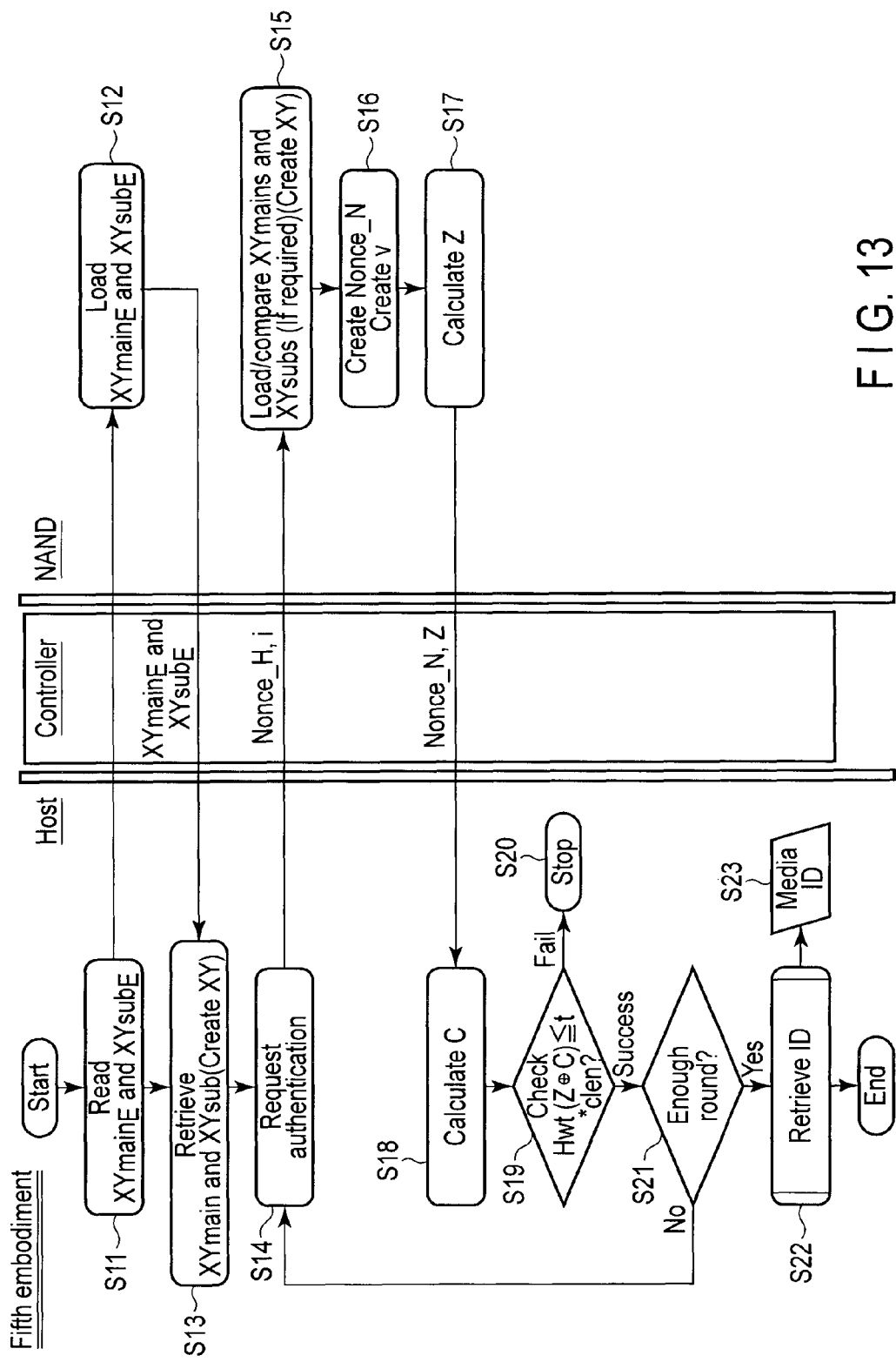
FIG. 13 is a flow chart illustrating an authentication flow according to the fifth embodiment.

Next, referring to FIG. 12 and FIG. 13, a description is given of authenticator/authenticatees and an authentication method according to a fifth embodiment.
<Structure Example (Memory System)>
Referring to FIG. 12, a structure example of the fifth embodiment is described. The structure example of the fifth embodiment is an example relating to a combination of the third and fourth embodiments.

As shown in FIG. 12, the NAND flash memory 10 of the fifth embodiment differs from that of the fourth embodiment in that duplicate data XYsub[i, j] and XYsub$_E$[i, j] of XYsub and XYsub$_E$ are also recorded in the hidden area 11-2.

In addition, this embodiment further includes a check sum & select module 12-0B and a data cache 12B for adapting to the above.
<Authentication Flow>
Next, referring to FIG. 13, the authentication operation according to the fifth embodiment is described.

In the fifth embodiment, XYsubs are also multiply recorded in the NAND flash memory 10 (XYsub[i, j] and XYsub$_E$[i, j]).

Thus, in step S15, the NAND flash memory 10 further reads out at least two XYsubs, compares them, and executes authentication by using XYsub including no error (Load/compare XYs and XYsubs).
<Advantageous Effects>
According to the authenticator/authenticatees and the authentication method relating to the fifth embodiment, the above points (I) to (IV) can be improved, and at least the above-described advantageous effect (1) can be obtained.

Furthermore, according to the fifth embodiment, the NAND flash memory 10 also records the XYsub[i, j] and XYsub$_E$[i, j] of XYsub and XYsub$_E$ in the hidden area 11-2.

Where necessary, the structure and method of the present embodiment are applicable.

Sixth Embodiment

Figure 14:
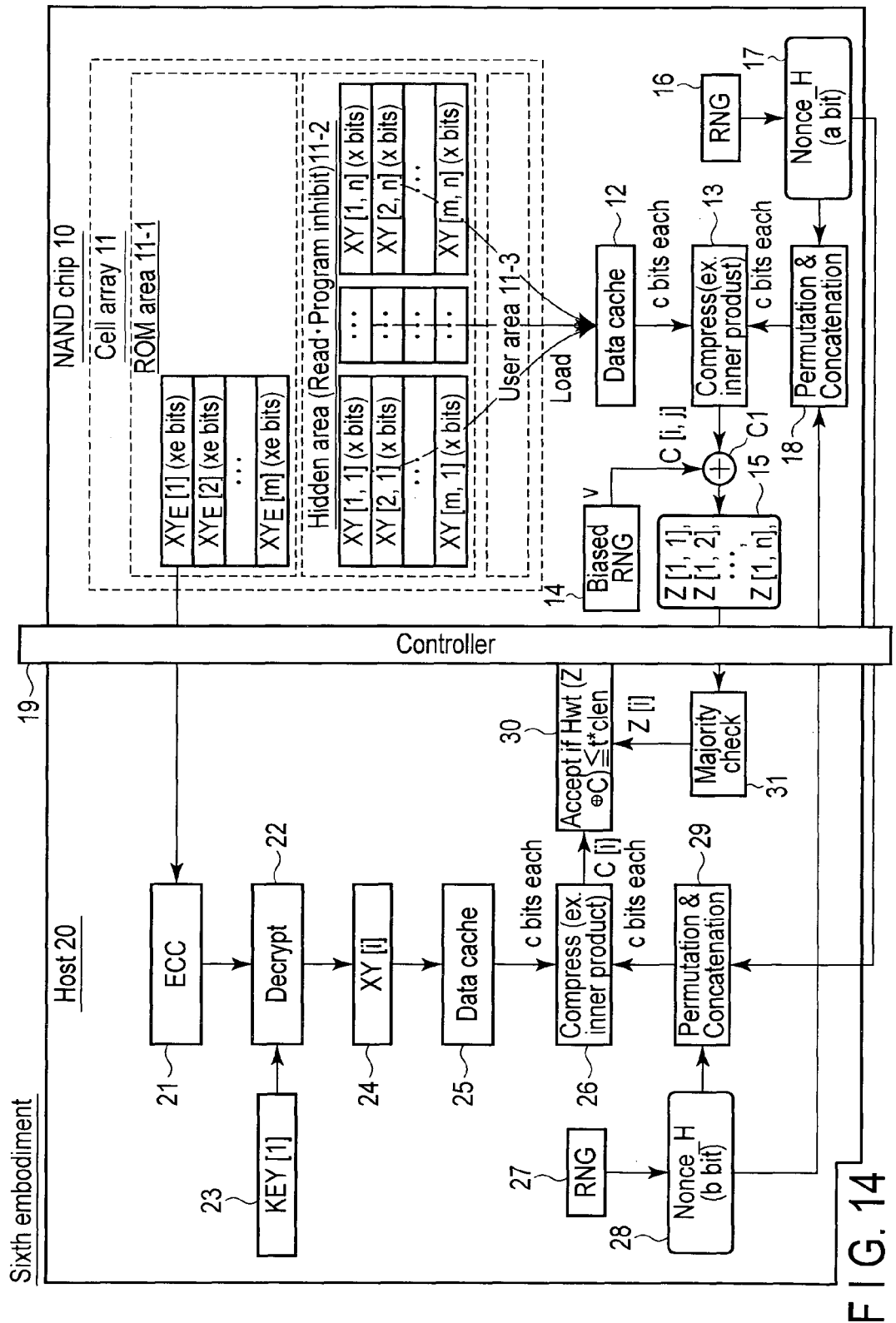
FIG. 14 is a block diagram showing a structure example according to a sixth embodiment.
Figure 15:
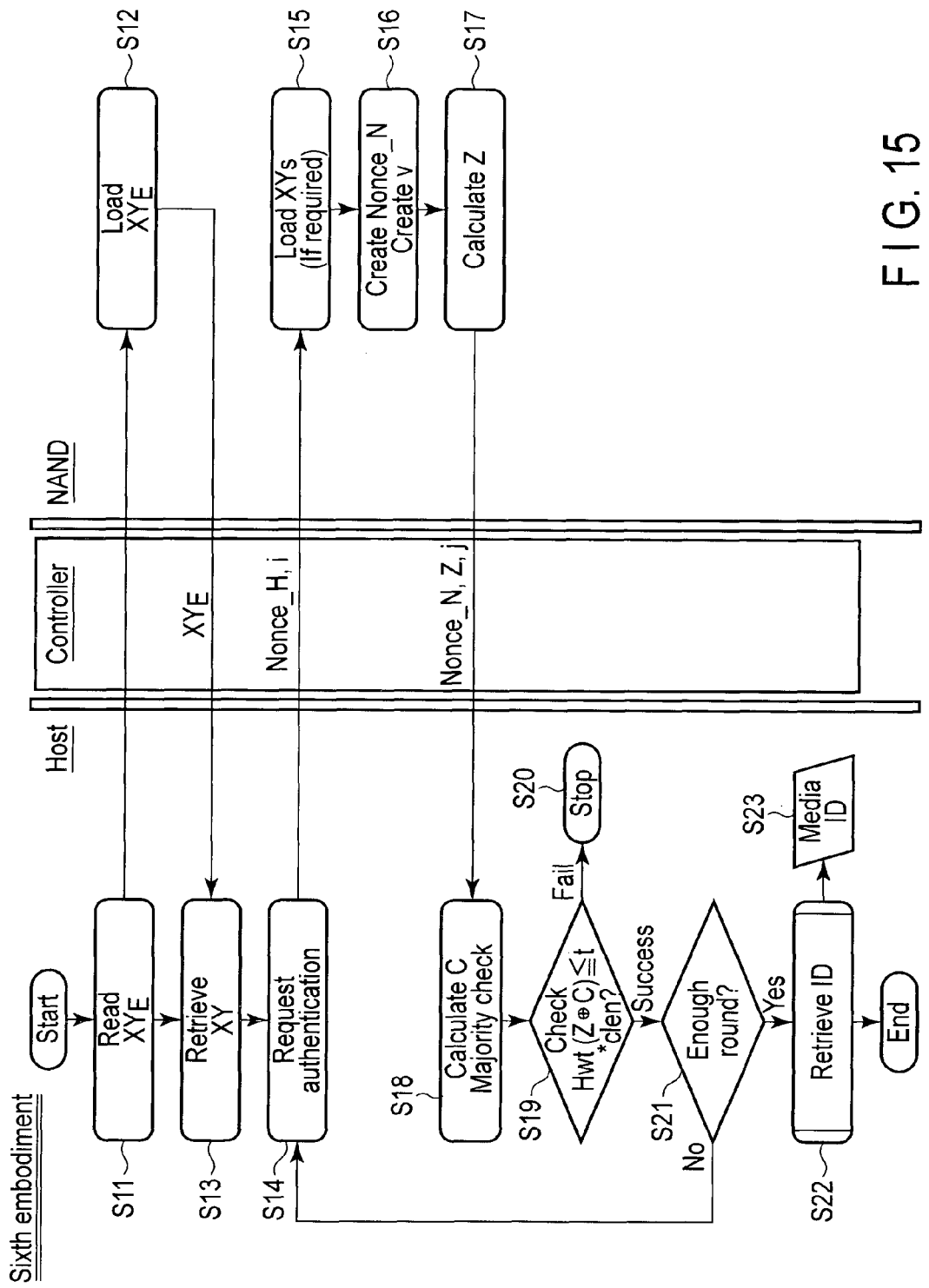
FIG. 15 is a flow chart illustrating an authentication flow according to the sixth embodiment.

Next, referring to FIG. 14 and FIG. 15, a description is given of authenticator/authenticatees and an authentication method according to a sixth embodiment.
<Structure Example (Memory System)>
Referring to FIG. 14, a structure example of the sixth embodiment is described.

Also in the sixth embodiment, the NAND flash memory 10 includes information which is created by duplicating a plurality of pieces of XY[i]. Specifically, the data, which are created by duplicating XY[i] in the second embodiment, are indicated by XY[i, 1], XY[i, 2], ..., XY[i, n] in FIG. 14, and XY[i, 1]=XY[i, 2]=, ..., XY[i, n], where 1≤i≤m. In addition, XY[1, j]≠XY[2, j]≠, ..., XY[m, j], where 1≤j≤n.

In this example, the duplication of XY data is the same as in the fourth embodiment. However, in the sixth embodiment, the comparison process of duplicate data is not executed on the NAND flash memory 10 side. Instead, the comparison process is executed in the host 20. In this respect, the sixth embodiment differs from the fourth embodiment. In addition, the six embodiment differs from the fourth embodiment in that the host 20 includes a majority check module (Majority check) 31.

Specifically, in accordance with i which is designated by the host 20, the NAND flash memory 10 loads at least two of XY[i, 1], XY[i, 2], ..., XY[i, n], and executes the above-described authentication process with respect to each XY. In this case, the identical Nonce_N and identical Nonce_H are used for each XY, and also the identical v that is created by the biased RNG is applied.

The transmission module 15 of the NAND flash memory 10 calculates a plurality of Z (Z[i, 1], Z[i, 2], ..., Z[i, n]) with respect to plural XYs under the same conditions of the other parameters, and sends them to the host 20.

After receiving the plurality of Z (Z[i, 1], Z[i, 2], ..., Z[i, n]), the host device executes a majority check by the majority check module 31 and obtains a single Z. In this case, when each Z is composed of a plurality of bit elements, and when the output of the compression calculation module is composed of plural bits, the majority check is executed on a bit-by-bit basis.

After obtaining Z from which an error has been eliminated by the majority check, the host device executes the same determination process 30 as described above, thereby authenticator the NAND flash memory 10.
<Authentication Flow>
Next, referring to FIG. 15, the authentication operation according to the sixth embodiment is described.

In the sixth embodiment, the NAND flash memory 10 calculates a plurality of Z's by using the XYs which are multiply recorded in the NAND flash memory 10, and sends the Z's. The host device executes the majority check on the plural Z's, thereby obtaining a single Z and executing authentication.

Thus, in step S17, the NAND flash memory 10 transmits the calculated plural Z's and j's to the host 20.

Subsequently, in step S18, the host 20 executes a majority check (Majority check) of the plural Z's, which is the difference from the fourth embodiment.
<Advantageous Effects>
According to the authenticator/authenticatees and the authentication method relating to the sixth embodiment, the above points (I) to (IV) can be improved, and at least the above-described advantageous effect (1) can be obtained.

Furthermore, in the sixth embodiment, the NAND flash memory 10 further includes the information which is created by duplicating a plurality of XY[i]. In addition, the host 20 includes the majority check module (Majority check) 31.

Therefore, the load of the comparison process in the NAND flash memory 10, in which the calculation resources are restricted, can be reduced, and the host 20 with sufficient calculation resources can be relied upon to execute the comparison process (majority process) 31. As a result, advantageously, the increase in cost of the NAND flash memory 10 can be suppressed, and an error can be eliminated.

Seventh Embodiment

Figure 17:
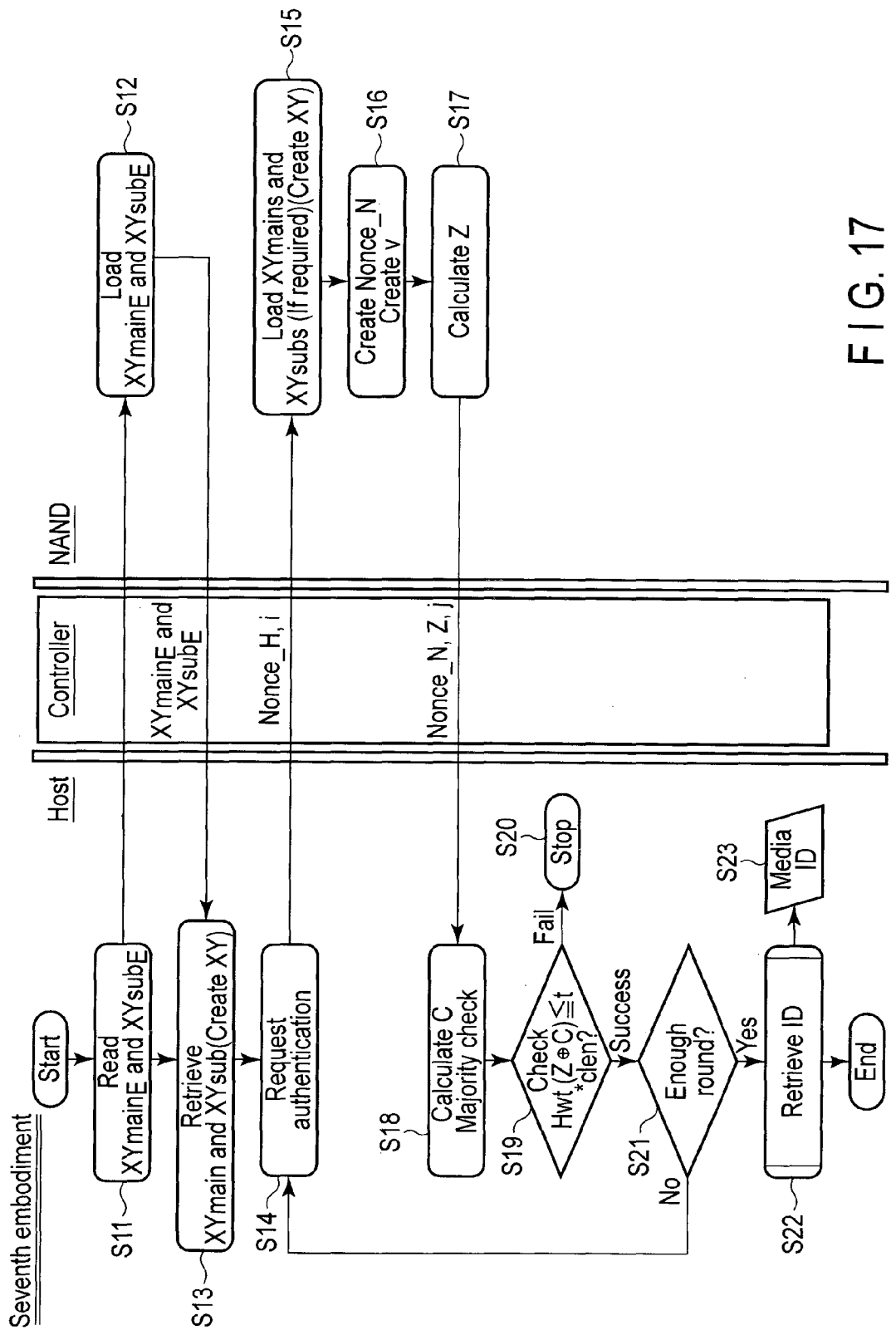
FIG. 17 is a flow chart illustrating an authentication flow according to the seventh embodiment.

Next, referring to FIG. 16 to FIG. 17, a description is given of authenticator/authenticatees and an authentication method according to a seventh embodiment.

<Structure Example (Memory System)>

Referring to FIG. 16, a structure example of the seventh embodiment is described. The seventh embodiment relates to an example of a combination of the third and sixth embodiments.

As shown in FIG. 16, the NAND flash memory 10 also stores duplicate data 11-2B and 11-1B of XYsub and $XYsub_E$. Like the above-described sixth embodiment, authentication data Z for plural XYs are calculated and sent to the host 20 by the calculation module 15, and a majority check 31 is executed in the host 20.

<Authentication Flow>

Next, referring to FIG. 17, the authentication operation according to the seventh embodiment is described.

In the seventh embodiment, the NAND flash memory 10 calculates a plurality of Z's by using the XYmain and XYsub, which are multiply recorded in the NAND flash memory 10, and sends the Z's. The host device executes the majority check on the plural Z's, thereby obtaining a single Z and executing authentication.

Thus, in step S11, the host 20 issues a read-out request (Read $XYmain_E$ and $XYsub_E$) of the multiply recorded XYmain and XYsub.

Subsequently, in step S12, the NAND flash memory 10 reads out the multiply recorded XYmain and XYsub (Load $XYmain_E$ and $XYsub_E$), and sends the XYmain and XYsub to the host 20 ($XYmain_E$ and $XYsub_E$).

<Advantageous Effects>

According to the authenticator/authenticatees and the authentication method relating to the seventh embodiment, the above points (I) to (IV) can be improved, and at least the advantageous effect (1) can be obtained.

Furthermore, according to the seventh embodiment, the NAND flash memory 10 also records the duplicate data 11-2B and 11-1B of XYsub and $XYsub_E$. Like the above-described sixth embodiment, the authentication data Z for plural XYs are calculated and sent to the host 20 by the calculation module 15, and the majority check 31 is executed in the host 20.

In this manner, where necessary, the present embodiment is applicable.

Eighth Embodiment

Media ID Retrieve Process

Next, referring to FIG. 18 to FIG. 21, an eighth embodiment is described. The eighth embodiment relates to various processes (Media ID retrieve process) of calculating a media ID (Media ID) in the above-described step S22.

ID Retrieve Process (1)

Figure 18:
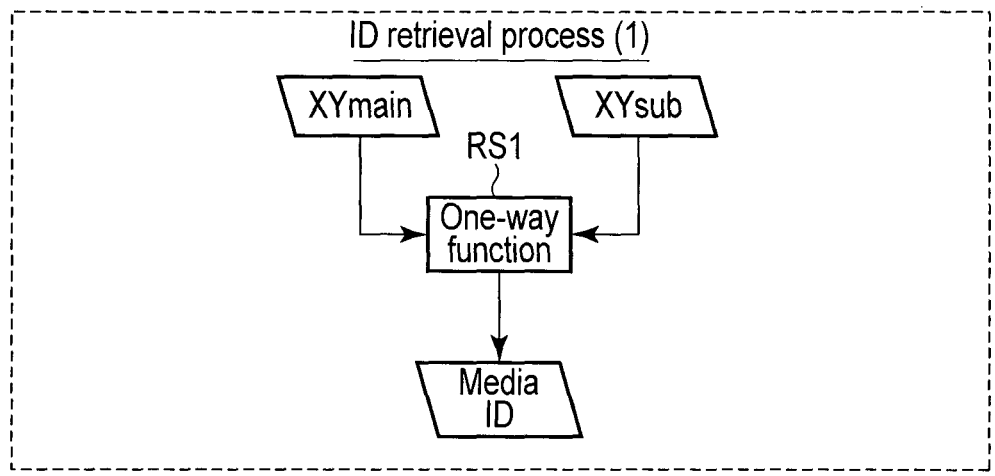
FIG. 18 is a block diagram illustrating an ID retrieval process (1) according to an eighth embodiment.

ID retrieve process (1) is as shown in FIG. 18. As shown in FIG. 18, in this example (1), in step RS1, a one-way function process (One-way function) is executed on XYmain and XYsub which are used in the above-described authentication. The result of the process is treated as the Media ID.

In this case, as the one-way function process, use can be made of a one-way arithmetic operation based on ciphers such as SHA-1, SHA-256 or AEG-H.

ID Retrieve Process (2)

Figure 19:
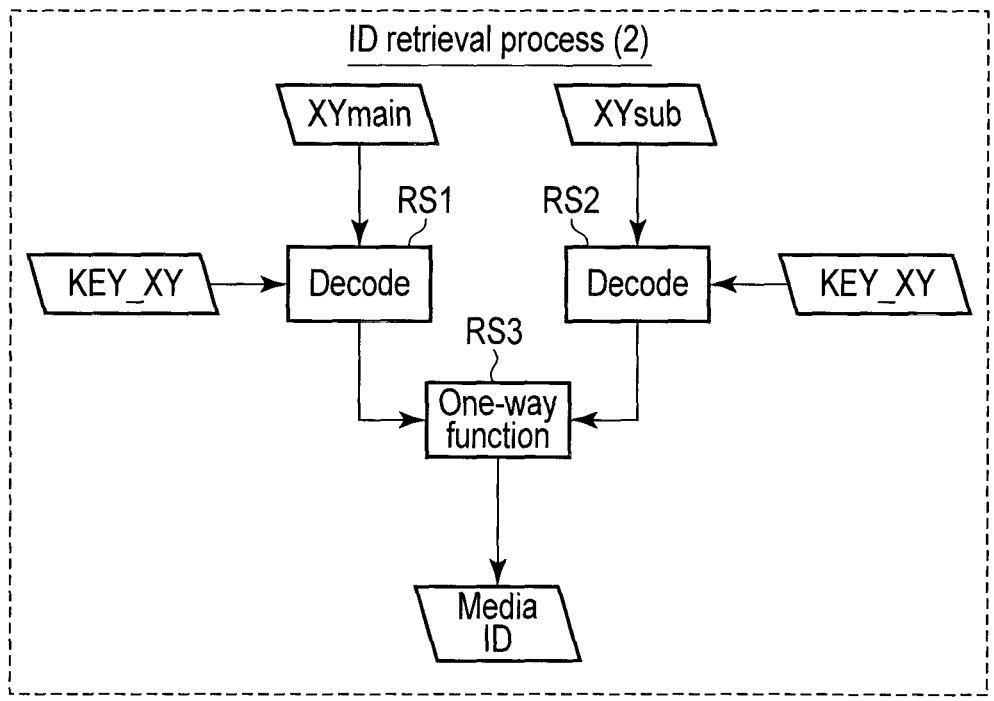
FIG. 19 is a block diagram illustrating an ID retrieval process (2) according to the eighth embodiment.

ID retrieve process (2) is as shown in FIG. 19. As shown in FIG. 19, in this example (2), in step RS1, RS2, the XYmain and XYsub, which have been used in the above-described authentication, are further subjected to a decoding process (Decode) by using the KEY_XY corresponding to one of the KEY_XYmain and KEY_XYsub which have been used in decryption of $KEY\_XYmain_E$ and $KEY\_XYsub_E$ in the above-described authentication process.

Subsequently, in step RS3, a similar one-way function process (One-way function) is executed, and the result of the process is treated as the Media ID.

ID Retrieve Process (3)

Figure 20:
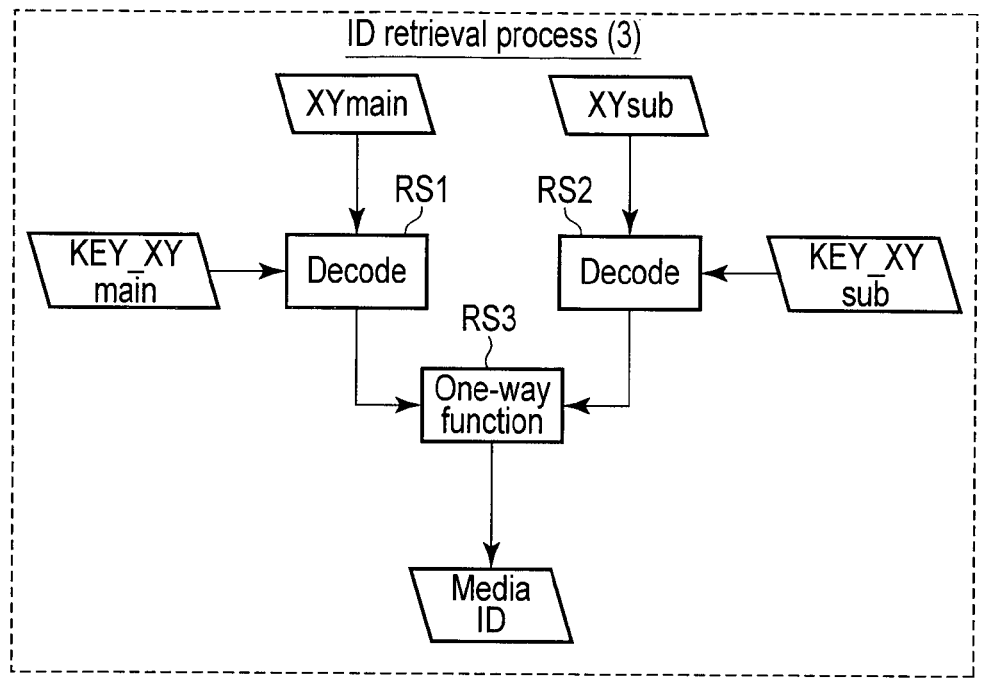
FIG. 20 is a block diagram illustrating an ID retrieval process (3) according to the eighth embodiment.

ID retrieve process (3) is as shown in FIG. 20. As shown in FIG. 20, in this example (3), in step RS1, RS2, the XYmain and XYsub, which have been used in the above-described authentication, are further subjected to a decoding process (Decode) by using the KEY_XYmain and KEY_XYsub which have been used in decryption of $KEY\_XYmain_E$ and $KEY\_XYsub_E$ in the above-described authentication process.

Subsequently, in step RS3, a similar one-way function process (One-way function) is executed, and the result of the process is treated as the Media ID.

ID Retrieve Process (4)

Figure 21:
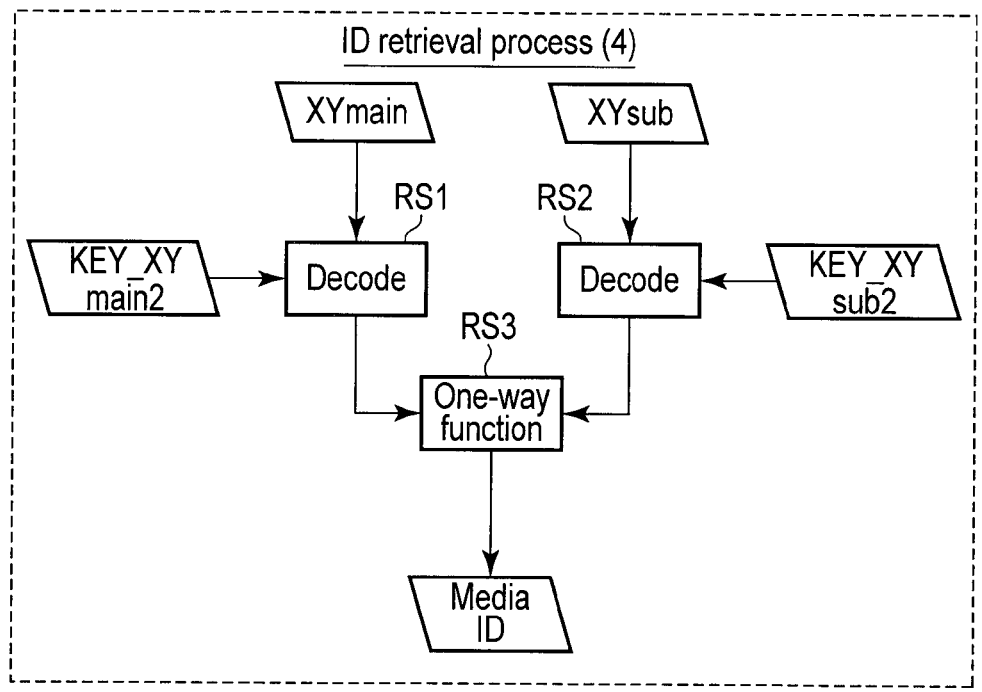
FIG. 21 is a block diagram illustrating an ID retrieval process (4) according to the eighth embodiment.

ID retrieve process (4) is as shown in FIG. 21. As shown in FIG. 21, in this example (4), in step RS1, RS2, the XYmain and XYsub, which have been used in the above-described authentication, are further subjected to a decoding process (Decode) by using KEY_XYmain2 and KEY_XYsub2 which are different from the KEY_XYmain and KEY_XYsub which have been used in decryption of $KEY\_XYmain_E$ and $KEY\_XYsub_E$ in the above-described authentication process. In this case, the KEY_XYmain2 and KEY_XYsub2 may have the same value.

Subsequently, in step RS3, a similar one-way function process (One-way function) is executed, and the result of the process is treated as the Media ID.

Ninth Embodiment

Media ID Binding Process

Figure 22:
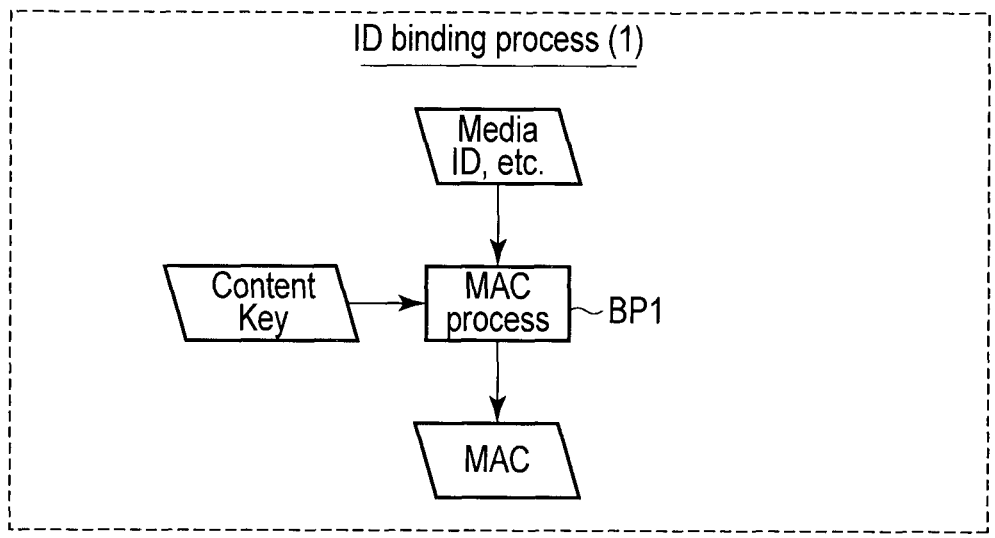
FIG. 22 is a block diagram illustrating an ID binding process (1) according to a ninth embodiment.
Figure 23:
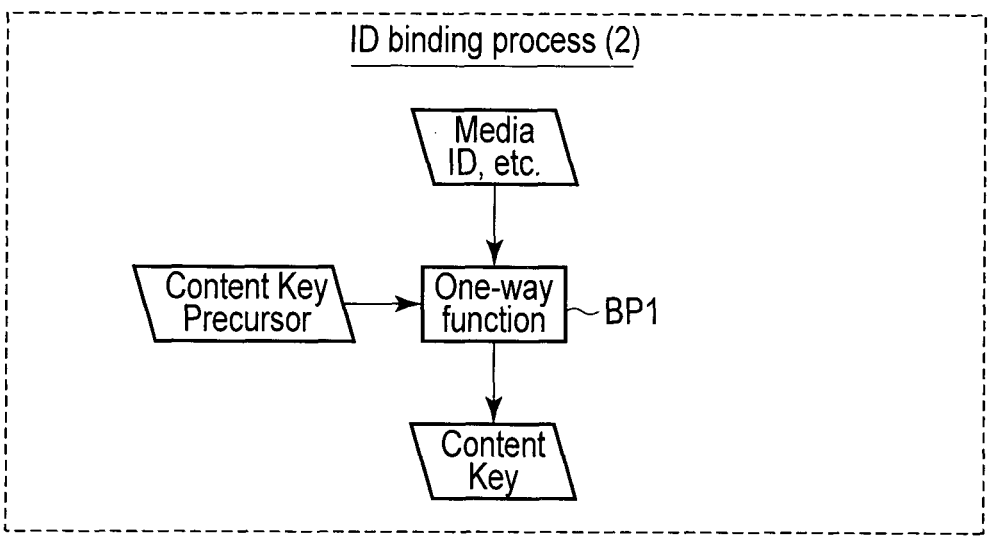
FIG. 23 is a block diagram illustrating an ID binding process (2) according to the ninth embodiment.

Next, referring to FIG. 22 and FIG. 23, a ninth embodiment is described. The ninth embodiment relates to a use method of Media ID (Media ID binding process).

For example, when commercial moving picture content or the like is recorded on a physical medium and played back, such a method is used that identification information unique to the physical medium is used in an encryption process at a time of content recording, and the content is bound to the physical medium.

At a time of playing back the content, such a method is adopted that a decryption process or a check process based on the identification information is executed, and when the identification information that has been reproduced does not agree with the identification information which was used in the encryption process at the time of recording the content, the playback of the content is stopped. Examples of the physical medium include a removable medium such as an SD card, and an embedded memory which is incorporated in a mobile phone, etc.

In any case, the object of the above-described method is to stop playback of unlawfully duplicated content, when encrypted content, which is recorded on a certain medium, has been unlawfully copied to another medium. As information for this purpose, use is made of the above-described identification information (media ID) which varies from media to media.

ID Binding Process (1)

ID binding process (1) is as shown in FIG. 22. As shown in FIG. 22, in this example (1), a MAC (Message Authentication Code) generation process is executed, and this is used for preventing unlawful duplication.

Specifically, in step BP1, in an example of a method of using Media ID as the above-described identification information, a MAC generation process is executed on Media ID or other information, based on Content Key which is used for content encryption.

Subsequently, in an apparatus which records content in media, the MAC is generated and the generated MAC is recorded on the media. In an apparatus which plays back the content from the media, the recorded MAC is checked, based on the Media ID, or Content Key. When the authenticity has been confirmed, the content is played back. When the authenticity has not been confirmed, such a method is applied that the playback of the content is stopped.

ID Binding Process (2)

ID binding process (2) is as shown in FIG. 23. As shown in FIG. 23, in this example (2), Media ID is used as information for generating Content Key which is used for content encryption.

In step BP1, in an apparatus which records content in media, Media ID and Content Key Precursor are subjected to a one-way function process (One-way function).

In the apparatus which records content in media, the content which has been encrypted by the processed Content Key is recorded.

In an apparatus which plays back the content from the media, the recorded Content Key Precursor and Media ID are subjected to a similar one-way function process, thereby obtaining the Content Key. Thus, the decryption and playback of the content are executed.

In the case where the Media ID does not coincide, that is, in the case where the content data has been unlawfully copied to different media, the derived Content Key does not coincide with the Content Key which was used in the content encryption. Thus, the decryption of the content fails, and the playback is stopped.

Tenth Embodiment

An Example of a Memory and a Storage/Playback Host

Figure 24:
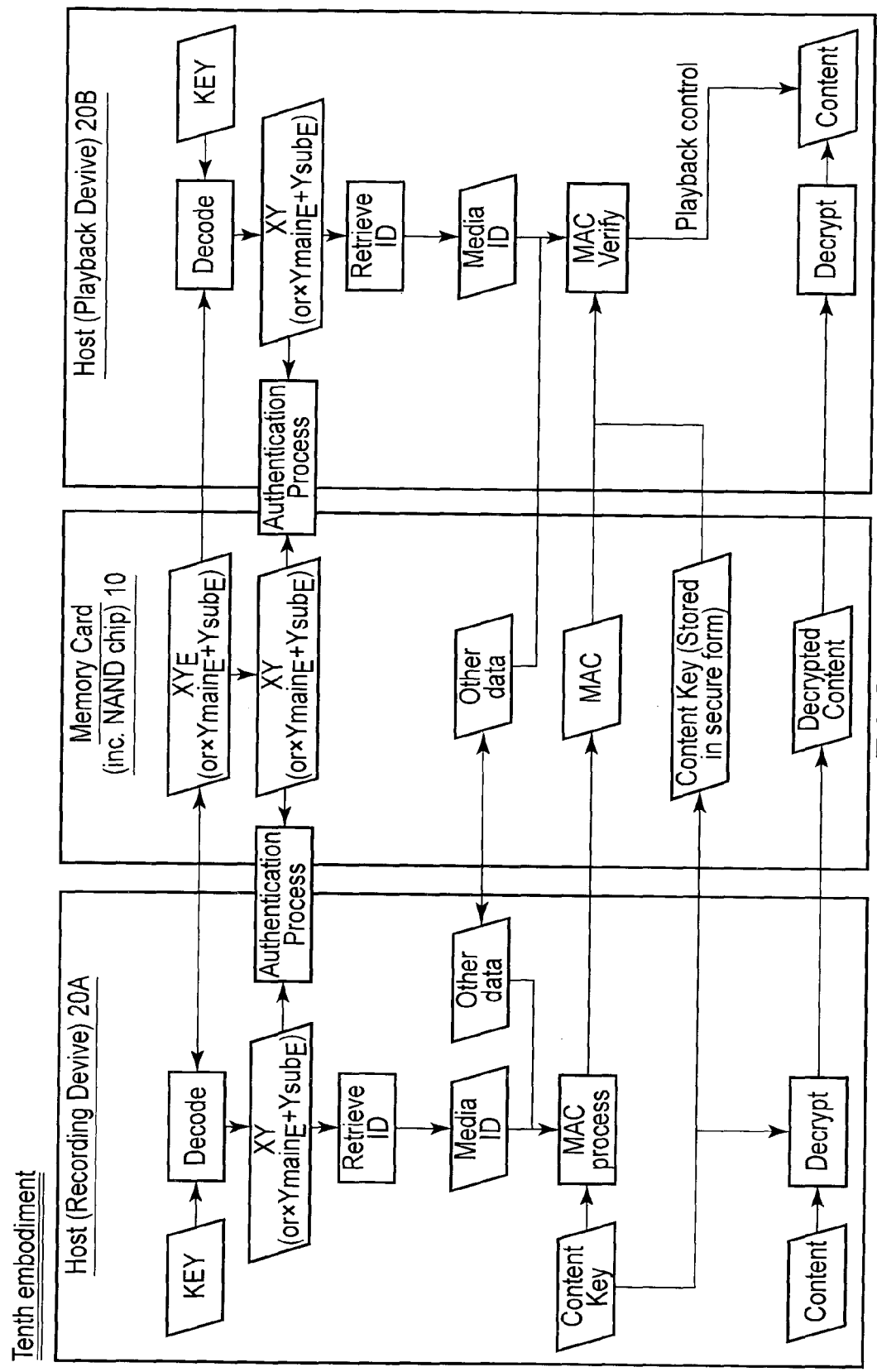
FIG. 24 is a block diagram showing a structure example according to a tenth embodiment.

Next, referring to FIG. 24, a tenth embodiment is described. The tenth embodiment relates to an example in which in a system of a memory card (inc. NAND chip) 10, a recording host (Recording Device) 20A and a playback host (Playback Device) 20B, which is a combination of the structures of the above-described embodiments, the above-described authentication is executed and content is played back in the host 20B by using the above-described media ID.

When the recording host (Recording Device) 20A records content in the memory card (inc. NAND chip) 10, the authentication process in the above embodiments is first executed between the memory card (inc. NAND chip) 10 and the recording host (Recording Device) 20A. After the authentication process has been successfully executed, the ID retrieval process in the above embodiments is executed. Then, the MAC, which has been generated by the ID binding process (1) in the above embodiment, is recorded in the memory card (inc. NAND chip) 10. In addition, content (Encrypted Content) encrypted by the Content Key used in the ID binding process (1) is recorded. Further, the Content Key itself is also recorded in a secure form. The secure form, in this context, may be a form of recording in a recording area in the memory card (inc. NAND chip) 10 which becomes accessible after the authentication is successfully executed between the memory card (inc. NAND chip) 10 and the recording host (Recording Device) 20A. The authentication, in this context, may be the authentication method described in the present application, or may be realized by some other authentication function which is possessed by the memory card (inc. NAND chip) 10. Another example of the secure form may be an encrypted form by a key which is possessed by the memory card (inc. NAND chip) 10 or the recording host (Recording Device) 20A.

When the playback host (Playback Device) 20B reads out the content from the memory card (inc. NAND chip) 10 and plays back the content, the authentication process in the above embodiments is first executed between the memory card (inc. NAND chip) 10 and the playback host (Playback Device) 20B. After the authentication process has been successfully executed, the ID retrieval process in the above embodiments is executed. Then, the MAC, which is recorded in the memory card (inc. NAND chip) 10, is verified by the process corresponding to the ID binding process (1) in the above embodiment. Thereafter, the Content Key is read out from the memory card (inc. NAND chip) 10, and the encrypted content (Encrypted Content) is decrypted, and thereby the content is played back.

Eleventh Embodiment

Another Example of a Memory and a Storage/Playback Host

Figure 25:
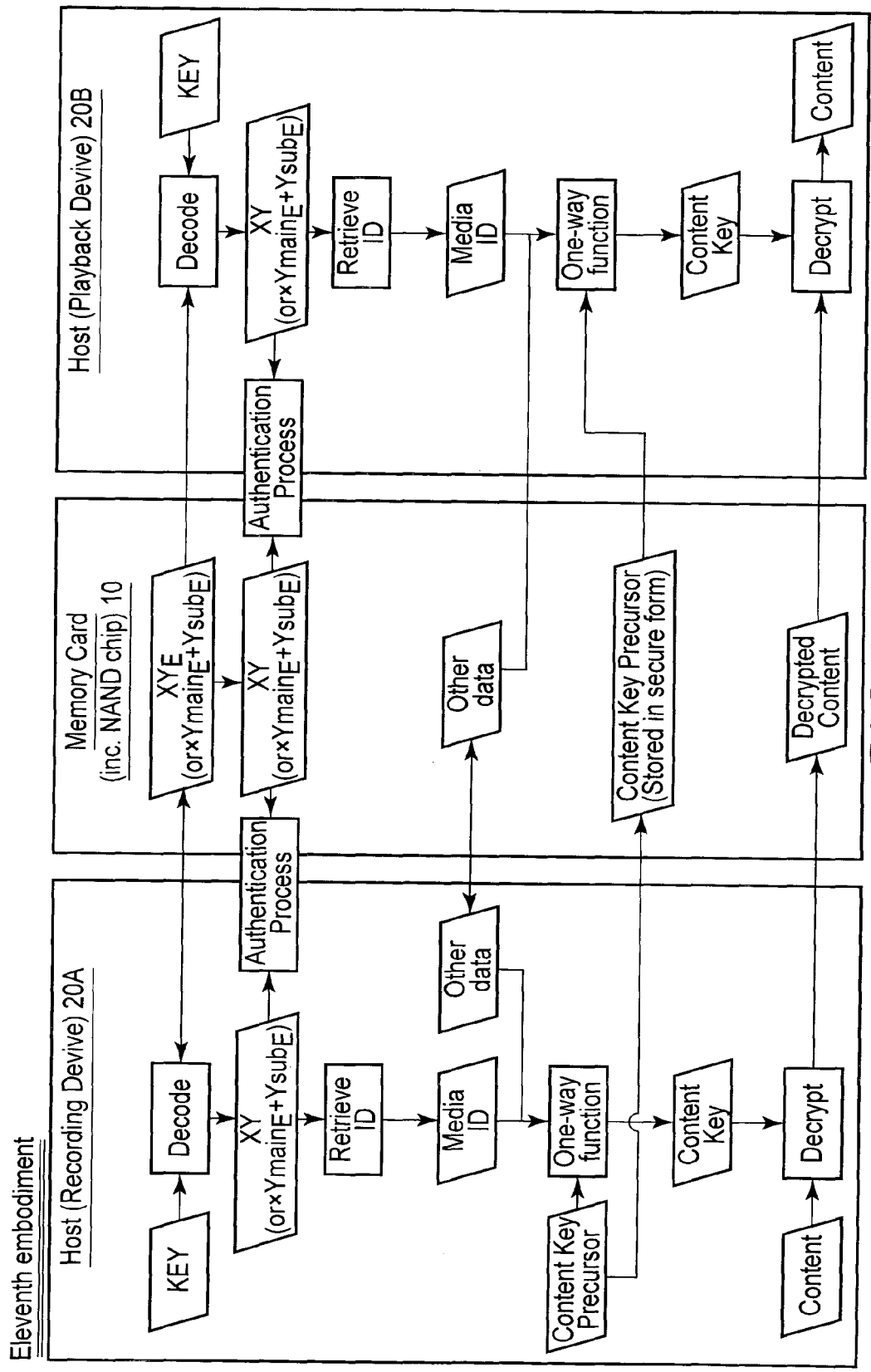
FIG. 25 is a block diagram showing a structure example according to an eleventh embodiment.

Next, referring to FIG. 25, an eleventh embodiment is described. The eleventh embodiment relates to an example in which in a system of a memory card (inc. NAND chip) 10, a recording host (Recording Device) 20A and a playback host (Playback Device) 20B, which is a combination of the structures of the above-described embodiments, the above-described authentication is executed and content is played back in the host 20B by using the above-described media ID.

When the recording host (Recording Device) 20A records content in the memory card (inc. NAND chip) 10, the authentication process in the above embodiments is first executed between the memory card (inc. NAND chip) 10 and the recording host (Recording Device) 20A. After the authentication process has been successfully executed, the ID retrieval process in the above embodiments is executed. Then, the Content Key, which has been generated by the ID binding process (1) in the above embodiment, is recorded in the memory card (inc. NAND chip) 10. In addition, content (Encrypted Content) encrypted by the Content Key, which has been generated by the ID binding process (2), is recorded. Further, the Content Key Precursor itself is also recorded in a secure form.

The secure form, in this context, may be a form of recording in a recording area in the memory card (inc. NAND chip) 10 which becomes accessible after the authentication is successfully executed between the memory card (inc. NAND chip) 10 and the recording host (Recording Device) 20A. The authentication, in this context, may be the authentication method described in the present application, or may be realized by some other authentication function which is possessed by the memory card (inc. NAND chip) 10. Another example of the secure form may be an encrypted form by a key which is possessed by the memory card (inc. NAND chip) 10 or the recording host (Recording Device) 20A.

When the playback host (Playback Device) 20B reads out the content from the memory card (inc. NAND chip) 10 and plays back the content, the authentication process in the above embodiments is first executed between the memory card (inc. NAND chip) 10 and the playback host (Playback Device) 20B. After the authentication process has been successfully executed, the ID retrieval process in the above embodiments is executed. Then, the Content Key is generated from the Content Key Precursor, which is recorded in the memory card (inc. NAND chip) 10, by the process corresponding to the ID binding process (2) in the above embodiment. Thereafter, the encrypted content (Encrypted Content) is decrypted, and thereby the content is played back.

Twelfth Embodiment

An Example of a Memory, a Controller and a Host

Figure 26:
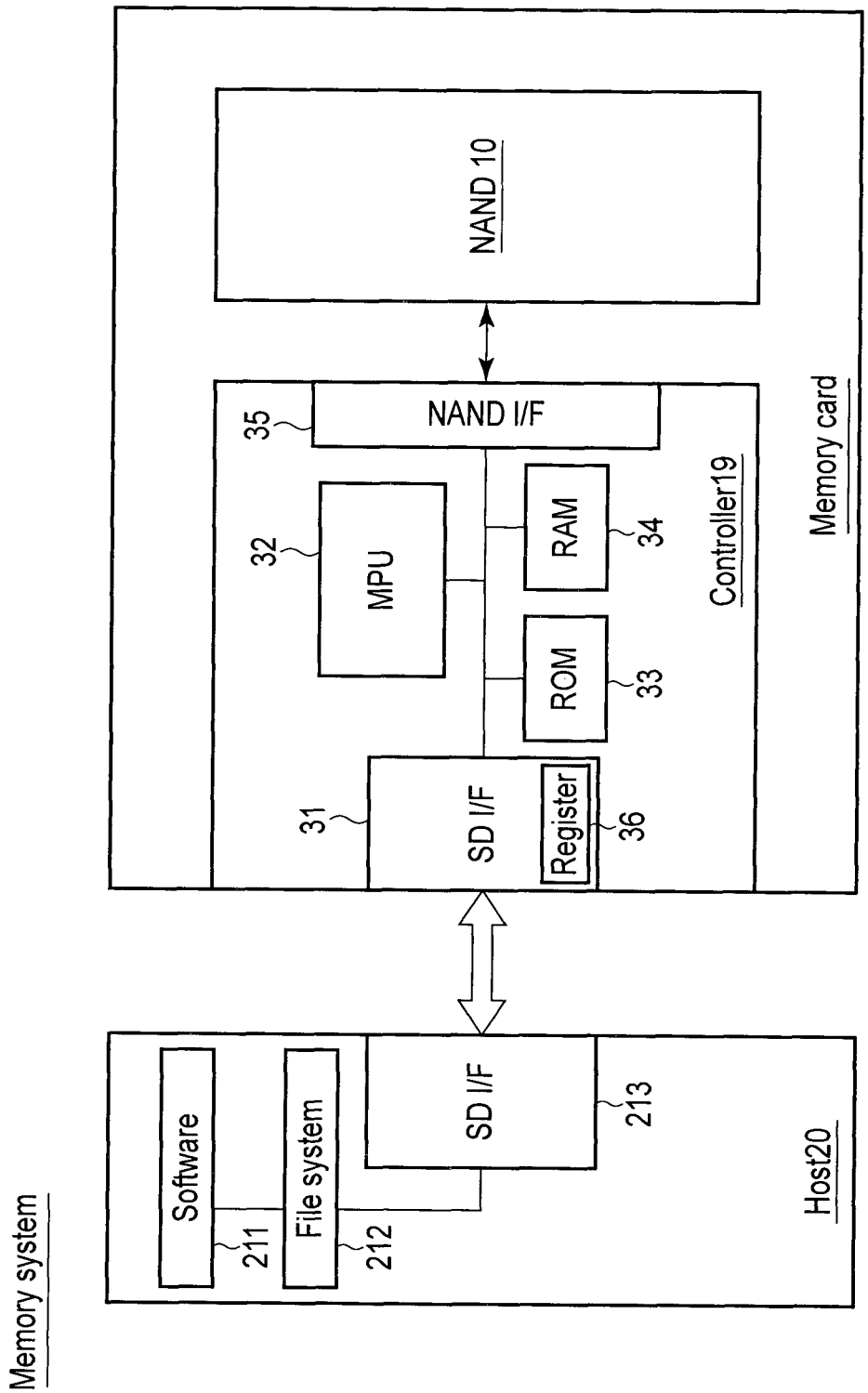
FIG. 26 is a block diagram showing a structure example according to a twelfth embodiment.

Next, referring to FIG. 26, a twelfth embodiment is described. The twelfth embodiment relates to an example of the NAND flash memory 10, controller 19 and host 20, which are applicable to the above-described embodiments. In this embodiment, an SD card (trademark) is taken as an example of a memory card.

As shown in FIG. 26, in this embodiment, functional blocks of the host device, which is connected to the memory card, are illustrated. The respective functional blocks can be realized by either hardware or computer software, or by a combination of both. Thus, the respective blocks are described, in general, from the standpoint of their functions, so as to clarify by which of them each block is realized. Whether such functions are executed as hardware or software depends on concrete modes of implementation or on design restrictions imposed on the entire system. A person skilled in the art may realize these functions by various methods in each concrete mode of implementation, but all methods of implementation fall within the scope of the present invention.

The host 20 includes software 211 such as an application or an operating system. The software 211 is instructed by the user to write data in the memory card, or to read out data from the memory card. The software 211 instructs a file system 212 to write and read data. The file system 212 is a scheme for managing file data which is recorded in a storage medium that is an object of management. The file system 212 records management information in a memory area in the storage medium, and manages the file data by using the management information.

The host 20 includes an SD interface 213. The SD interface 213 is composed of hardware and software, which are necessary for executing an interface process between the host 20 and the memory card. The host 20 communicates with the memory card via the SD interface 213. The SD interface 213 specifies various protocols which are necessary for communication between the host 20 and the memory card, and includes a set of various commands which are mutually recognizable by an SD interface 31 of the memory card, which will be described later. In addition, the SD interface 213 includes a hardware structure (arrangement of pins, number of pins, etc.) which is connectable to the SD interface 31 of the memory card.

The memory card includes a NAND flash memory 10 and a controller 19 for controlling the memory 10. When the memory card is connected to the host 20, or when the host 20 is turned on in the state in which the memory card is inserted in the host 20 that is in the OFF state, the memory card is supplied with power, executes an initializing process, and executes a process corresponding to the access from the host 20.

The NAND memory 10 stores data in a nonvolatile state, and executes data write and read in a unit called "page" which comprises a plurality of memory cells. A unique physical address is allocated to each page. In addition, the memory 10 executes erase of data in a unit called "block" (erase block) which comprises a plurality of pages. In some cases, a physical address is allocated to a physical block unit.

The controller 19 manages the storage state of data by the memory 10. The management of the storage state includes managing a relationship between a physical address of a page (or a physical block) and a logical address of data which is stored in this page, and managing which physical address is indicative of a page (or a physical block) that is in an erase state (a state in which no data is written or invalid data is stored).

The controller 19 includes an SD interface 31, an MPU 32, a ROM (read only memory) 33, a RAM (random access memory) 34, and a NAND interface 35.

The SD interface 31 is composed of hardware and software, which are necessary for executing an interface process between the host 20 and the controller 19. Like the SD interface 213, the SD interface 31 specifies protocols which enable communication between both, includes a set of various commands, and also includes a hardware structure (arrangement of pins, number of pins, etc.). The memory card (controller 19) communicates with the host 20 via the SD interface 31. The SD interface 31 includes a register 36.

The MPU 32 controls the entire operation of the memory card. For example, when the memory card is supplied with power, the MPU 32 reads out firmware (control program), which is stored in the ROM 33, into the RAM 34, and executes a predetermined process. The MPU 32 creates various tables on the RAM 34 according to the control program, or executes a predetermined process on the memory 10 according to a command which is received from the host 20.

The ROM 33 stores, e.g. a control program which is controlled by the MPU 32. The RAM 34 is used as a working area of the MPU 32, and temporarily stores the control program or various tables. Such tables include a conversion table (logical/physical table) for converting a logical address allocated to data by the file system 12 to a physical address of a page in which the data is actually stored. The NAND interface 35 executes an interface process between the controller 19 and the memory 10.

The memory areas in the NAND flash memory 10 include, for example, a system data area, a secret data area, a protected data area, a user data area, etc., in accordance with the kinds of data which is stored. The system data area is an area which is secured in the memory 10 by the controller 19 in order to store data which is necessary for the operation of the controller 19. The secret data area stores key information for use in encryption, and secret data for use at time of authentication, and is inaccessible from the host 20. The protected data area stores important data, secure data, etc. The user data area is freely accessible and usable by the host 20, and stores, for instance, user data such as AV content files and image data. The controller 19 secures a part of the user data area, and stores control data (e.g. logical/physical address conversion table) which is necessary for the operation of the controller 19 itself.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. An authentication method between an authenticatee, including first circuitry and which stores first secret information, second secret information, third secret information and fourth secret information, where the third and fourth secret information are created by encrypting the first and second secret information, respectively (data size: the second secret information<the first secret information the fourth secret information<the third secret information), and an authenticator including second circuitry and which authenticates the authenticatee, comprising:
   executing, by the authenticator including the second circuitry, a decryption process on the third and fourth secret information, which is received from the authenticatee, and sharing the first and second secret information;
   generating, by the authenticator including the second circuitry, fifth secret information based on the first and second secret information;
   receiving, by the authenticatee including the first circuitry, a random number B which is generated by the authenticator, and loading the first and second secret information;
   generating, by the authenticatee including the first circuitry, fifth secret information based on the first and second secret information;
   generating, by the authenticatee including the first circuitry, a random number A and data $v$ ($v$ having a probability $\eta$ of occurrence of 1 ($\eta<0.5$));
   generating, by the authenticatee including the first circuitry, a random number D which is composed of at least a part of the generated random number A and the received random number B;
   generating, by the authenticatee including the first circuitry, data C by executing a compression operation with respect to at least a part of the random number D and the fifth secret information;
   transmitting, by the authenticatee including the first circuitry, a calculated result Z from the data $v$ and the data C, to the authenticator;
   generating, by the authenticator including the second circuitry, a random number D which is composed of at least a part of the generated random number B and the received random number A;
   generating, by the authenticator including the second circuitry, data C by executing a compression operation with respect to at least a part of the random number D and the fifth secret information; and
   executing, by the authenticator including the second circuitry, a determination process by using the received calculated result Z and the generated data C, a successful result of the determination process by the authenticator authenticating the authenticatee.

2. The method of claim 1, wherein the third and fourth secret information each includes an error correction code, and
   the authenticator is configured to execute an error correction process on the third and fourth secret information, which are received from the authenticatee.

3. The method of claim 1, wherein the first secret information is identical within a group comprising a plurality of said authenticatees, and
   the second secret information is different between the authenticatees.

4. The method of claim 1, wherein the first secret information is stored in a ROM area of a memory which is included in the authenticatee, and
   the third secret information is stored in a hidden area of the memory.

5. The method of claim 4, wherein the authenticatee includes a controller configured to control the memory and to access the authenticator.

6. An authenticatee comprising:
   a memory configured to store first and second secret information and third and fourth secret information, where the third and fourth secret information is created by encrypting the first and second secret information, respectively (data size: second secret information<first secret information, fourth secret information<third secret information); and
   circuitry configured to
   generate a random number A;
   generate a random number D which is composed of at least a part of the generated random number A and a random number B which is received;
   generate fifth secret information based on the secret information first and second loaded from the memory;
   generate data C by executing a compression arithmetic operation with respect to at least a part of the random number D and the fifth secret information;
   generate data $v$ ($v$ having a probability $\eta$ of occurrence of 1 ($\eta<0.5$));
   a result Z from the data $v$ and the data C; and
   transmit the calculated result Z to an authenticator which executes a determination process using the calculated result Z and a generated data C, a successful result of the determination process by the authenticator authenticating the authenticatee,
   wherein the authenticator includes circuitry configured to
      execute a decryption process, with use of a key, on the third and fourth encrypted secret information,
      generate fifth secret information based on the first and second secret information;
      generate the random number B,
      generate a random number D which is composed of at least a part of the generated random number B and the random number A which is received,
      generate the data C by executing a compression calculated operation with respect to at least a part of the random number D and the fifth secret information.

7. The authenticatee of claim 6, wherein the third and fourth secret information, includes an error correction code.

8. The authenticatee of claim 6, wherein the first secret information is identical within a group comprising a plurality of said authenticatees, and
   the second secret information is different between the authenticatees.

9. The authenticatee of claim 6, wherein the first secret information is stored in a ROM area of the memory, and
   the third secret information is stored in a hidden area of the memory.

10. The authenticatee of claim 9, further comprising a controller configured to control the memory and to access the authenticator.

11. An authenticator which authenticates an authenticatee configured to store first and second secret information, and third and fourth secret information, where the third and fourth secret information is created by encrypting the first and second secret information, respectively (data size: second secret information<first secret information, fourth secret information<), comprising:
   processing circuitry configured to
   execute a decryption process, with use of a key, on the encrypted third and fourth secret information, and to share the first and second secret information;

generate fifth secret information based on the first and second secret information;

generate a random number B;

generate a random number D which is composed of at least a part of the generated random number B and a random number A which is received;

generate data C by executing a compression calculated operation with respect to at least a part of the random number D and the secret information XY; and execute a determination process by using the generated data C and a result Z which is received from the authenticatee, wherein the authenticatee includes circuitry configured to generate the random number A, generate a random number D which is composed of at least a part of the generated random number A and the random number B which is received, generate fifth secret information based on the secret information first and second loaded from memory, generate data C by executing a compression arithmetic operation with respect to at least a part of the random number D and the fifth secret information, generate data $v$ ($v$ having a probability $\eta$ of occurrence of 1 ($\eta<0.5$)), and calculate the result Z from the data $v$ and the data C.

12. The authenticator of claim 11, wherein the third and fourth secret information includes an error correction code.

13. The authenticator of claim 11, wherein the first secret information is identical within a group comprising a plurality of said authenticatees, and the second secret information is different between the authenticatees.

14. The authenticator of claim 11, wherein the first secret information is stored in a ROM area of a memory which is included in the authenticatee, and the third secret information is stored in a hidden area of the memory.

15. The authenticator of claim 14, wherein the authenticatee includes a controller configured to control the memory and to access the authenticator.

* * * * *